United States Patent [19]

Meints et al.

[11] Patent Number: 5,271,371
[45] Date of Patent: Dec. 21, 1993

[54] ACTUATOR AND VALVE ASSEMBLY FOR A HYDRAULICALLY-ACTUATED ELECTRONICALLY-CONTROLLED INJECTOR

[75] Inventors: Edward G. Meints, Peoria; Alan R. Stockner, Metamora, both of Ill.

[73] Assignee: Caterpillar Inc., Peoria, Ill.

[21] Appl. No.: 35,543

[22] Filed: Mar. 22, 1993

Related U.S. Application Data

[63] Continuation of Ser. No. 776,500, Oct. 11, 1991, abandoned.

[51] Int. Cl.⁵ .................. F02M 37/04; F02M 57/02
[52] U.S. Cl. .................................. 123/446; 123/501; 137/625.64
[58] Field of Search ................ 251/48, 54, 86, 129.05, 251/129.15; 137/625.64, 625.26, 625.27, 625.65; 123/446, 447, 501

[56] References Cited

U.S. PATENT DOCUMENTS

| | | | |
|---|---|---|---|
| Re. 33,270 | 7/1990 | Beck et al. | 123/447 |
| 2,793,077 | 5/1957 | Bovard | 299/107.2 |
| 3,329,165 | 7/1967 | Lang | 251/54 |
| 3,559,686 | 2/1971 | Hoffman | 137/625.26 |
| 3,689,205 | 9/1972 | Links | 417/401 |
| 3,753,426 | 8/1973 | Lilley | 123/139 E |
| 3,796,205 | 3/1974 | Links et al. | 123/139 E |
| 3,835,829 | 9/1974 | Links | 123/139 E |
| 3,982,694 | 9/1976 | Bailey | 239/96 |
| 4,071,197 | 1/1978 | Bailey et al. | 239/533.11 |
| 4,219,154 | 8/1980 | Luscomb | 239/91 |
| 4,221,192 | 9/1980 | Badgley | 123/456 |
| 4,271,807 | 6/1981 | Links et al. | 123/506 |
| 4,343,280 | 8/1982 | Luscomb | 123/472 |
| 4,372,272 | 2/1983 | Walter et al. | 123/467 |
| 4,392,612 | 7/1983 | Deckard et al. | 239/88 |
| 4,448,169 | 5/1984 | Badgley et al. | 123/467 |
| 4,449,507 | 5/1984 | Mayer | 123/467 |
| 4,459,959 | 7/1984 | Terada et al. | 123/446 |
| 4,480,619 | 11/1984 | Igashira et al. | 123/446 |
| 4,605,166 | 8/1986 | Kelly | 239/96 |
| 4,611,631 | 9/1986 | Kosugi et al. | 137/625.65 |
| 4,624,285 | 11/1986 | Perach | 137/625.65 |
| 4,840,198 | 6/1989 | Ott | 137/625.65 |
| 4,844,122 | 7/1989 | Ichihashi | 137/625.27 |
| 4,867,115 | 9/1989 | Henein | 123/179 L |
| 4,905,961 | 3/1990 | Ichihashi et al. | 251/129.15 |
| 4,915,134 | 4/1990 | Toliusis et al. | 137/625.27 |
| 4,957,085 | 9/1990 | Sverdlin | 123/467 |
| 4,979,542 | 12/1990 | Mesenich | 137/625.27 |
| 5,033,435 | 7/1991 | Ostarello et al. | 123/469 |
| 5,076,240 | 12/1991 | Perr | 123/502 |
| 5,085,248 | 2/1992 | Iwata et al. | 251/129.05 |
| 5,088,382 | 2/1992 | Goedecke et al. | 137/625.65 |

FOREIGN PATENT DOCUMENTS

1142824 3/1983 Canada .
149598 7/1985 European Pat. Off. .
59-185839A 10/1984 Japan .

OTHER PUBLICATIONS

SAE Paper No. 910252, Development Of New Electronically Controlled Fuel Injection System ECD-U2 For Diesel Engines, published Sep. 1991, by Miyaki et al.

Primary Examiner—E. Rollins Cross
Assistant Examiner—Thomas N. Moulis
Attorney, Agent, or Firm—Anthoney N. Woloch

[57] ABSTRACT

An actuator and valve assembly for a hydraulically-actuated electronically-controlled unit injector is disclosed which comprises an electrically-energizable actuator including a movable member and a poppet valve connected to the movable member. The poppet valve has a first seat and a second seat and is movable along an axis between first, second and third positions. The assembly further comprises a device for biasing the poppet valve towards its first position and a device for accommodating misalignment of the first and second seats relative to the axis. The poppet valve is advantageous because it has high fluid flow control capability in a one-piece single-stage configuration.

16 Claims, 10 Drawing Sheets

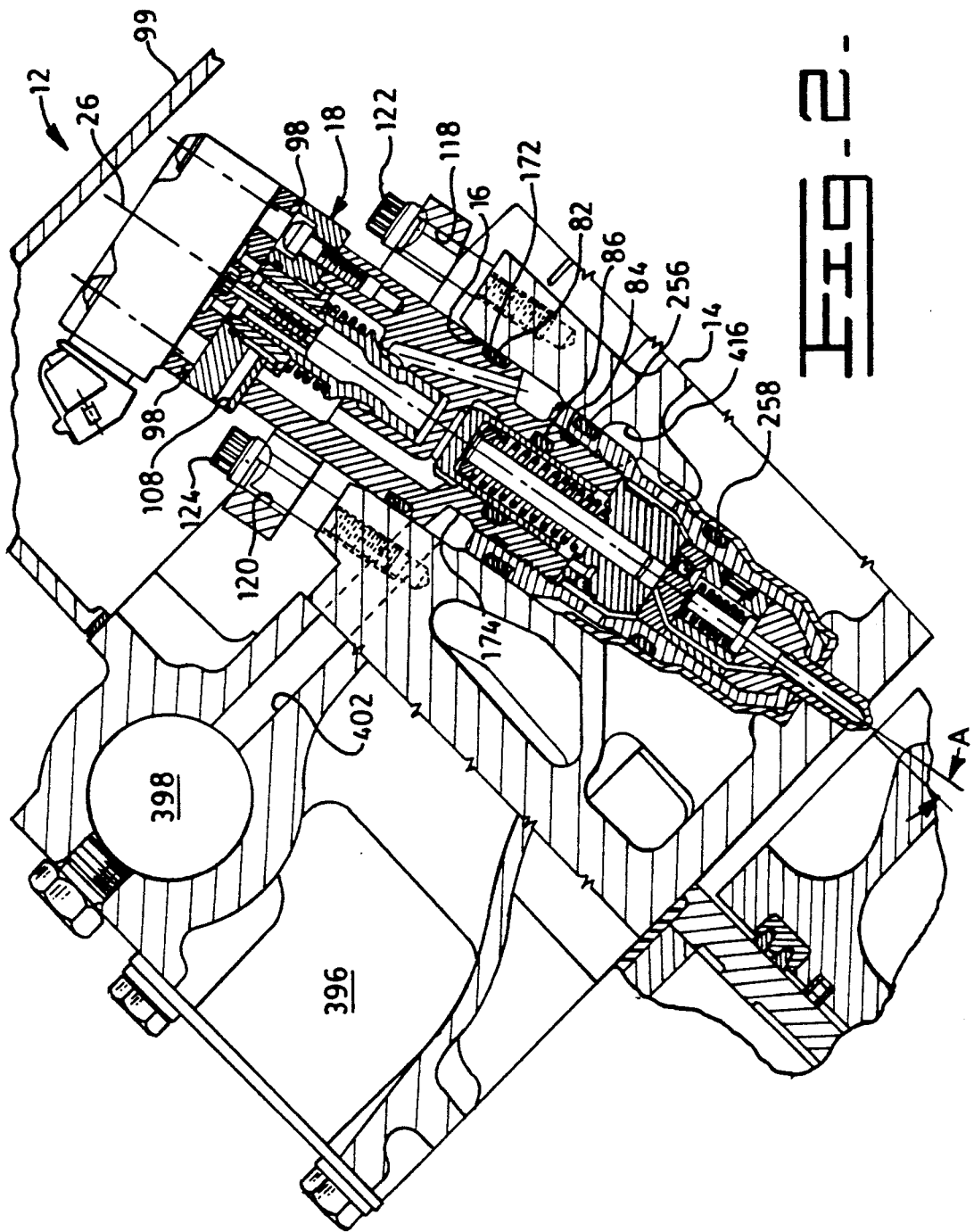

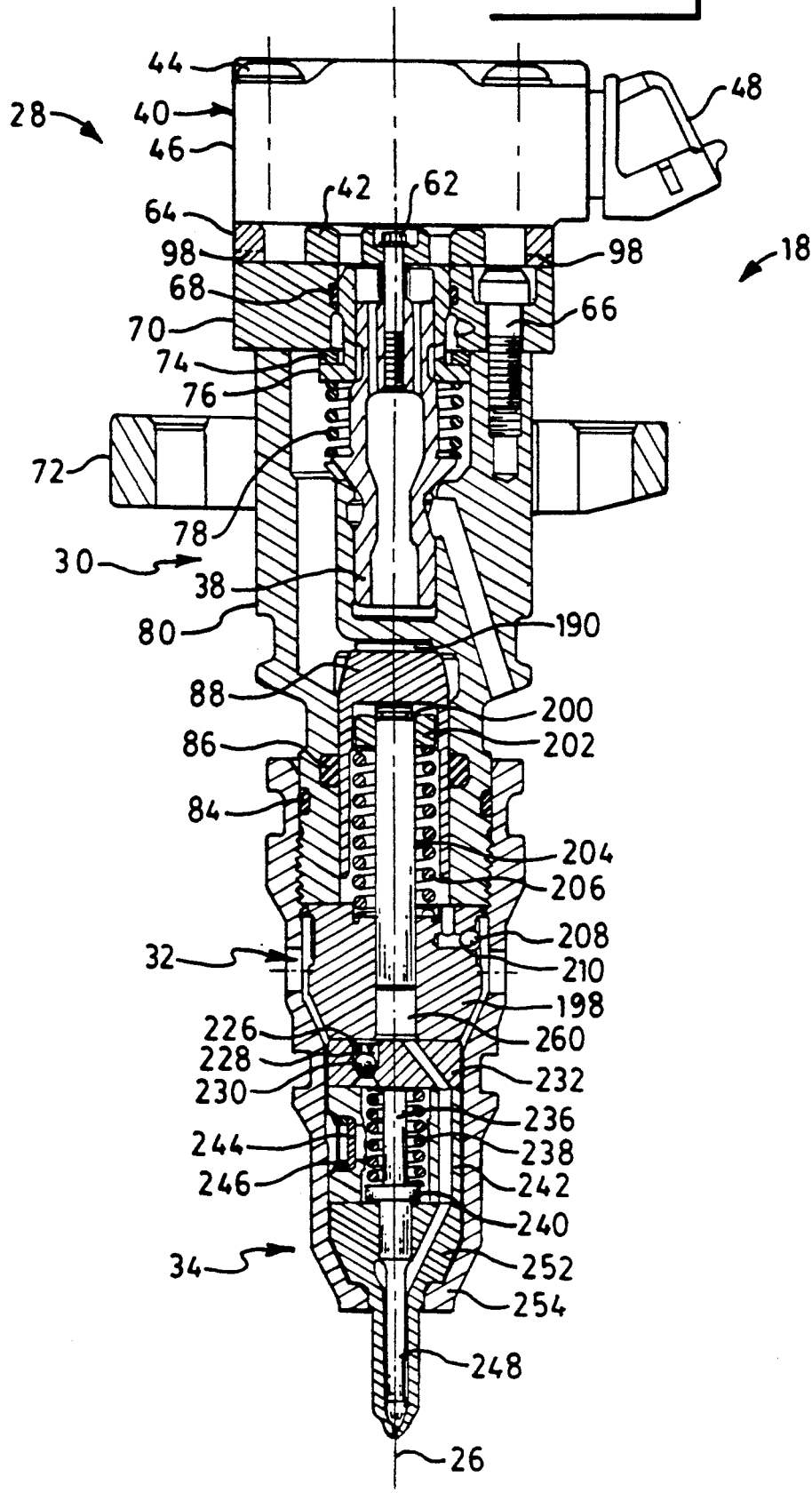

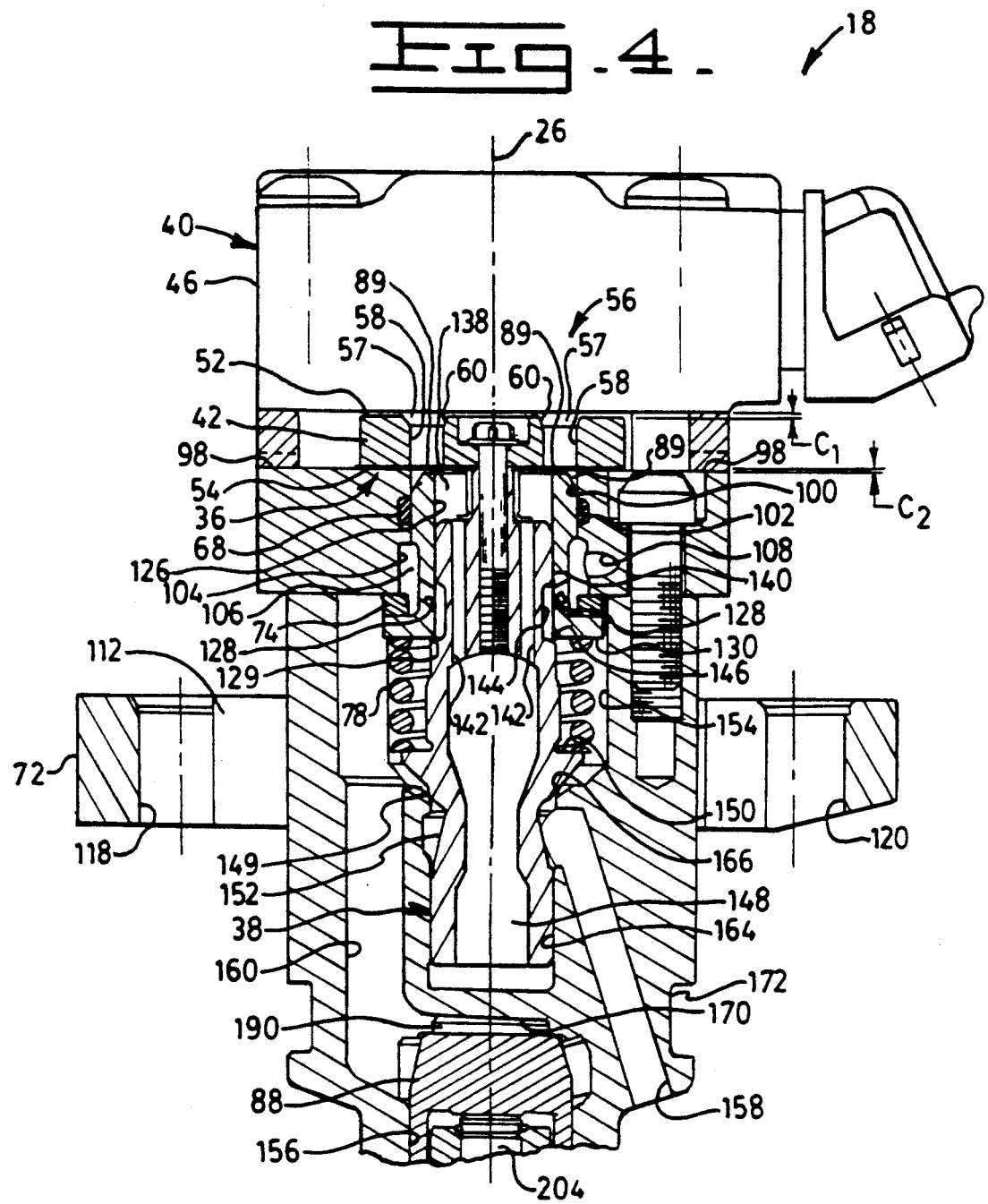

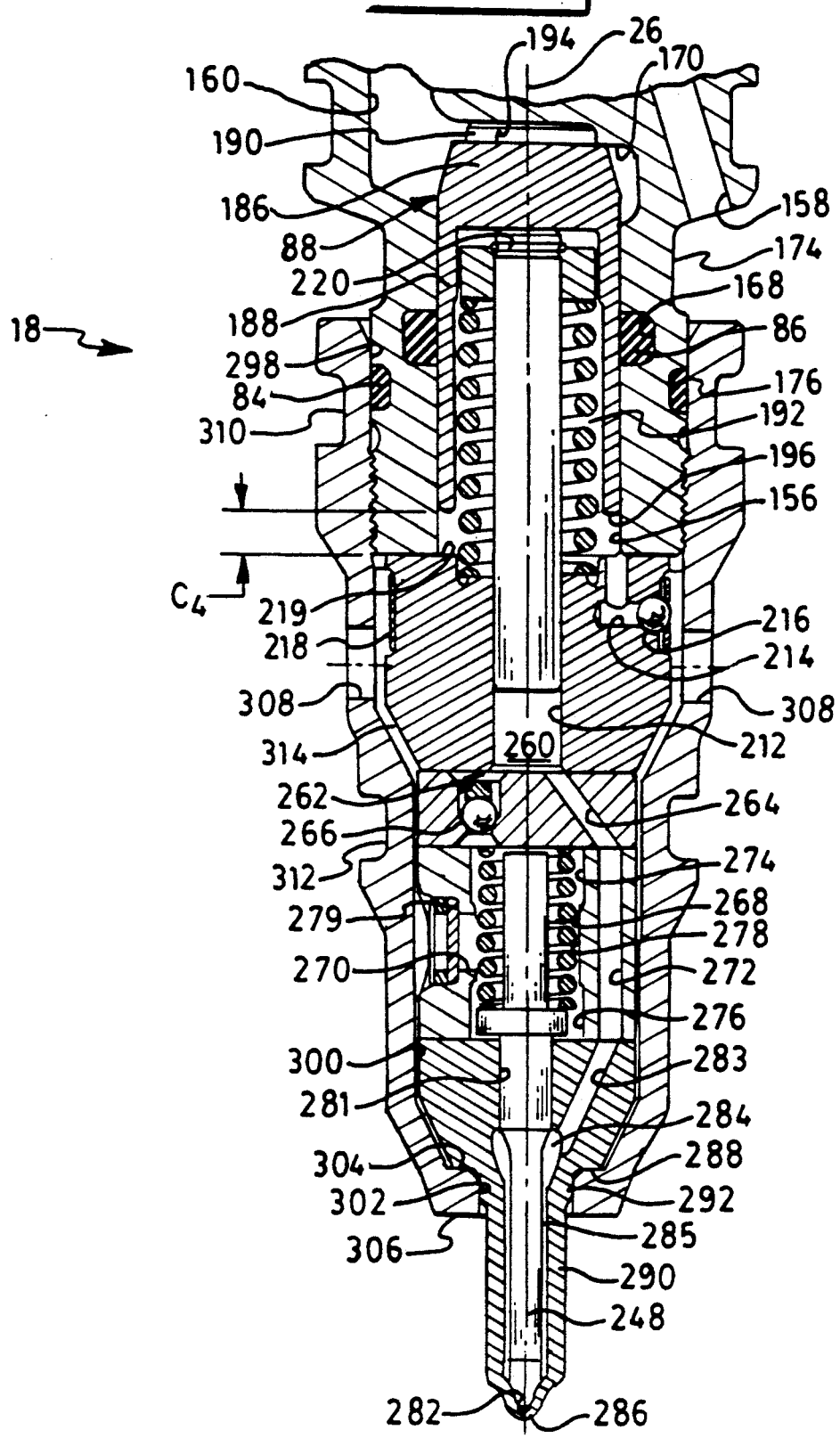

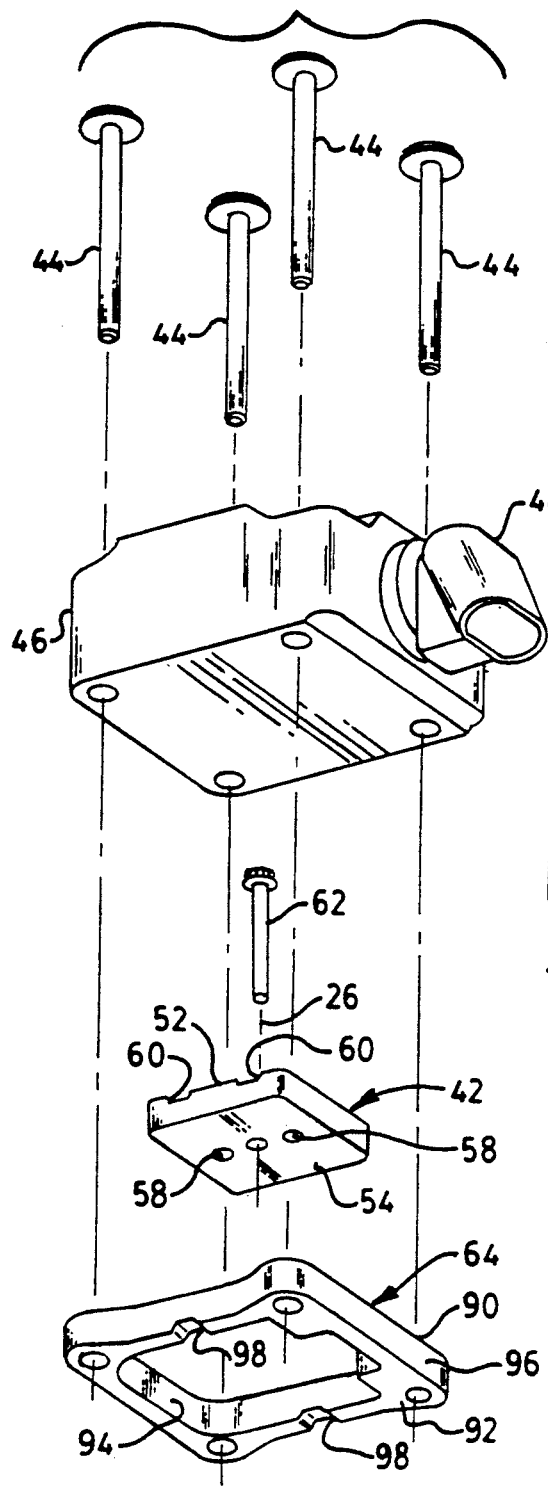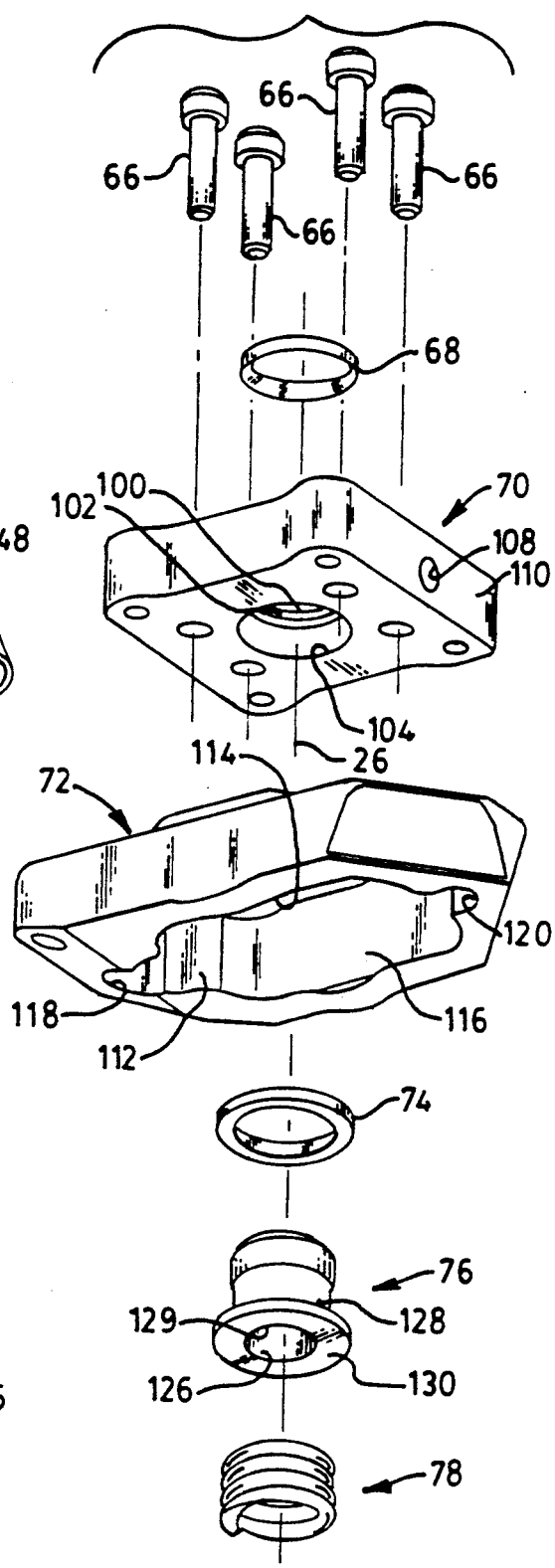

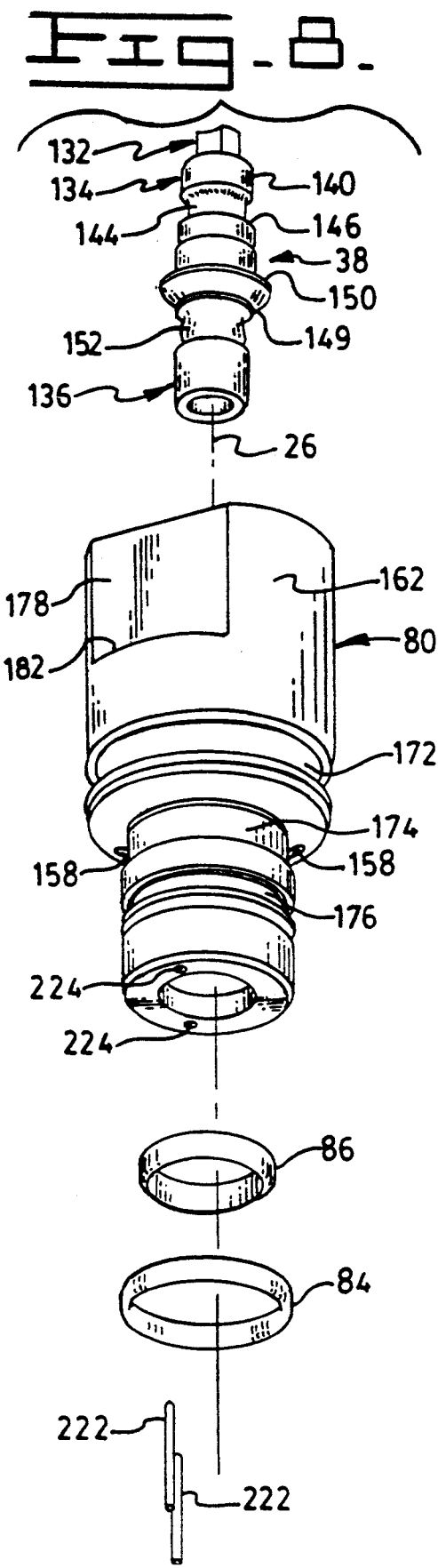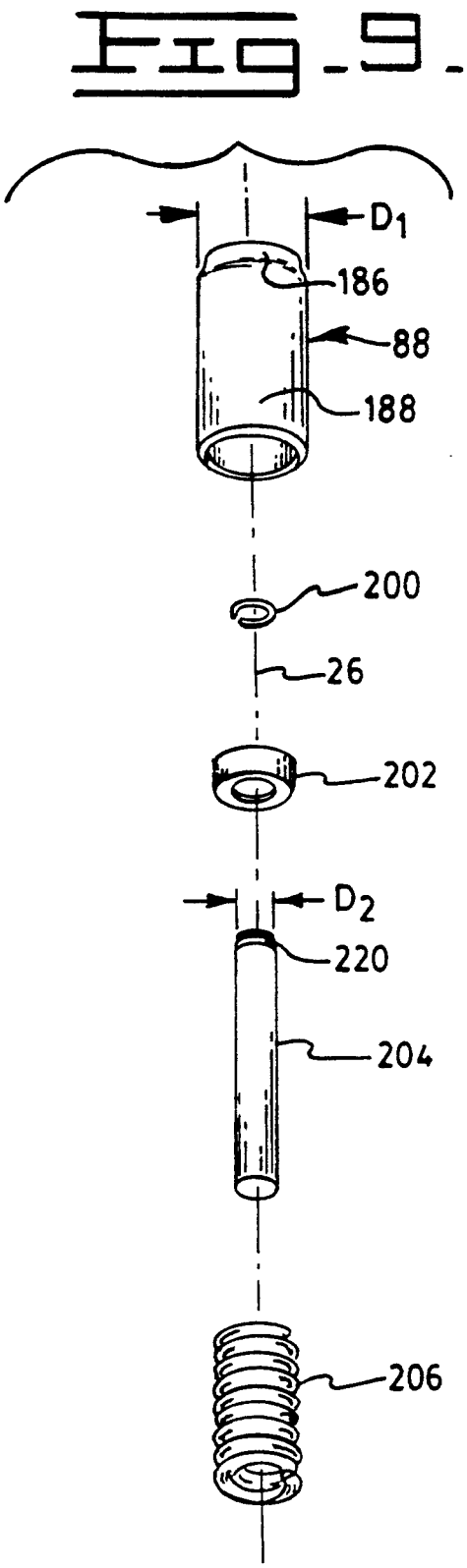

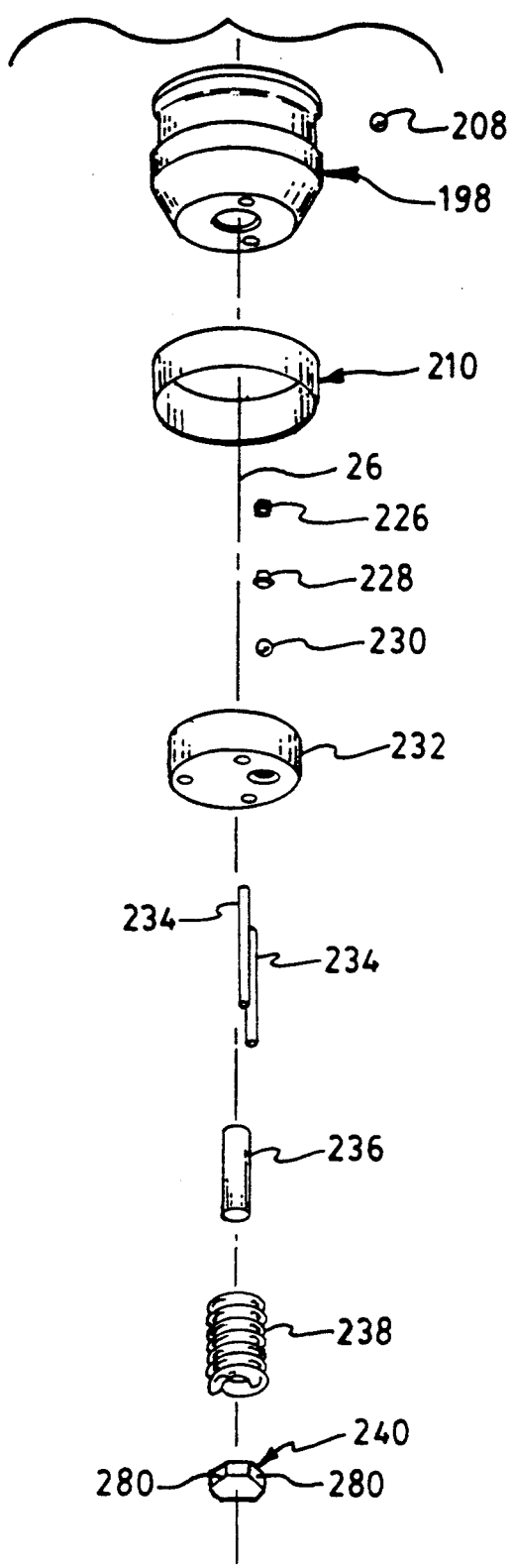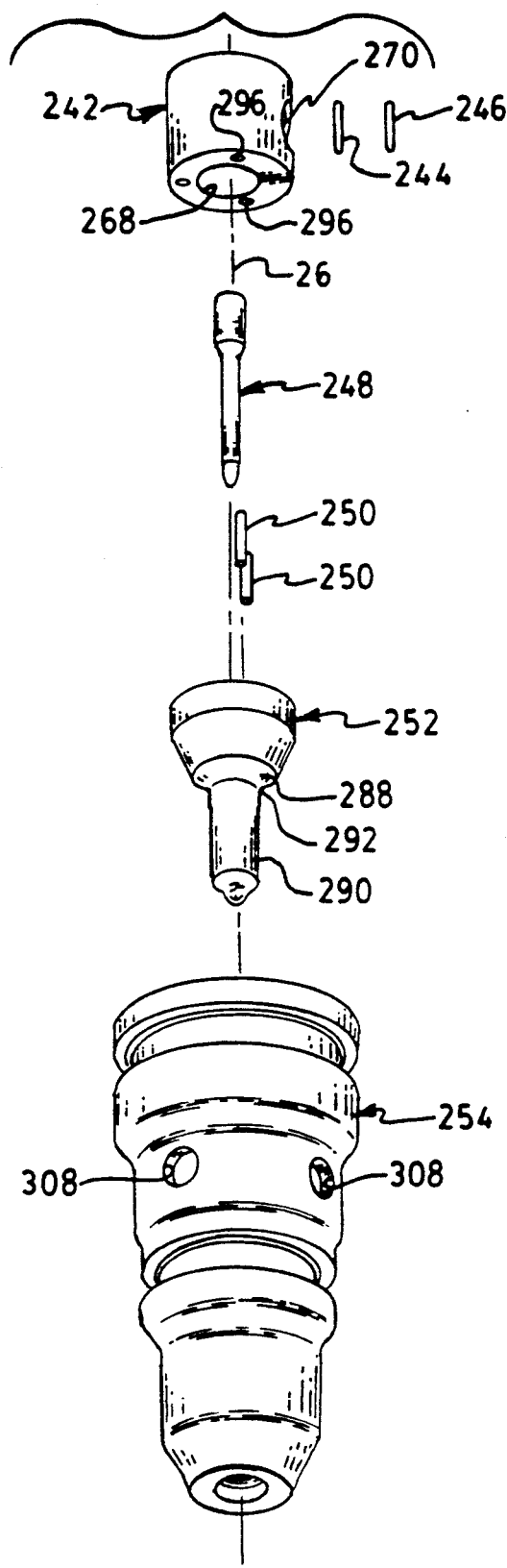

ACTUATOR AND VALVE ASSEMBLY FOR A HYDRAULICALLY-ACTUATED ELECTRONICALLY-CONTROLLED INJECTOR

This is a continuation of Ser. No. 07/776,500, filed Oct. 11, 1991 now abandoned.

TECHNICAL FIELD

The present invention relates generally to fuel injection systems and, more particularly to hydraulically-actuated electronically-controlled fuel injection systems.

BACKGROUND ART

Examples of hydraulically-actuated electronically-controlled unit injectors are shown in U.S. Pat. No. 3,689,205 issued to Links on Sep. 5, 1972, U.S. Pat. No. 3,796,205 issued to Links et al. on Mar. 12, 1974, and U.S. Pat. No. 3,835,829 issued to Links on Sep. 17, 1974. In each of these patents, a solenoid control valve is shown which includes a free floating sphere. The sphere serves as a valve which is movable between first and second valve seats. These patents do not disclose how the sphere is practically assembled within the unit injector nor do they address the problem of maintaining an adequate conformable seal between the free floating surface of the sphere and each of the valve seats.

The present invention is directed to overcoming one or more of the problems as set forth above.

DISCLOSURE OF THE INVENTION

In one aspect of the present invention an actuator and valve assembly for a hydraulically-actuated electronically-controlled unit injector is disclosed. The assembly comprises an electrically-energizable actuator including a movable member and a poppet valve connected to the movable member. The poppet valve is movable along an axis between first, second and third positions and can abut either a first seat or a second seat. The assembly further comprises a means for biasing the poppet valve towards its first position and a means for accommodating misalignment of the first and second seats relative to the axis.

BRIEF DESCRIPTION OF THE DRAWINGS

FIG. 2 is a diagrammatic partial cross-sectional view of one embodiment of a unit injector of FIG. 1 as installed in an exemplary internal combustion engine;

FIG. 3 is a diagrammatic isolated enlarged cross-sectional view of the unit injector shown in FIG. 2;

FIG. 4 is a diagrammatic enlarged partial view of an upper portion of the unit injector shown in FIG. 3;

FIG. 5 is a diagrammatic enlarged partial view of a lower portion of the unit injector shown in FIG. 3;

FIG. 6 is a diagrammatic exploded isometric view of a first portion of components shown in the unit injector of FIG. 3;

FIG. 7 is a diagrammatic exploded isometric view of a second portion of components shown in the unit injector of FIG. 3;

FIG. 8 is a diagrammatic exploded isometric view of a third portion of components shown in the unit injector of FIG. 3;

FIG. 9 is a diagrammatic exploded isometric view of a fourth portion of components shown in the unit injector of FIG. 3;

FIG. 10 is a diagrammatic exploded isometric view of a fifth portion of components shown in the unit injector of FIG. 3;

FIG. 11 is a diagrammatic exploded isometric view of a sixth portion of components shown in the unit injector of FIG. 3;

BEST MODE FOR CARRYING OUT THE INVENTION

Figure 1:
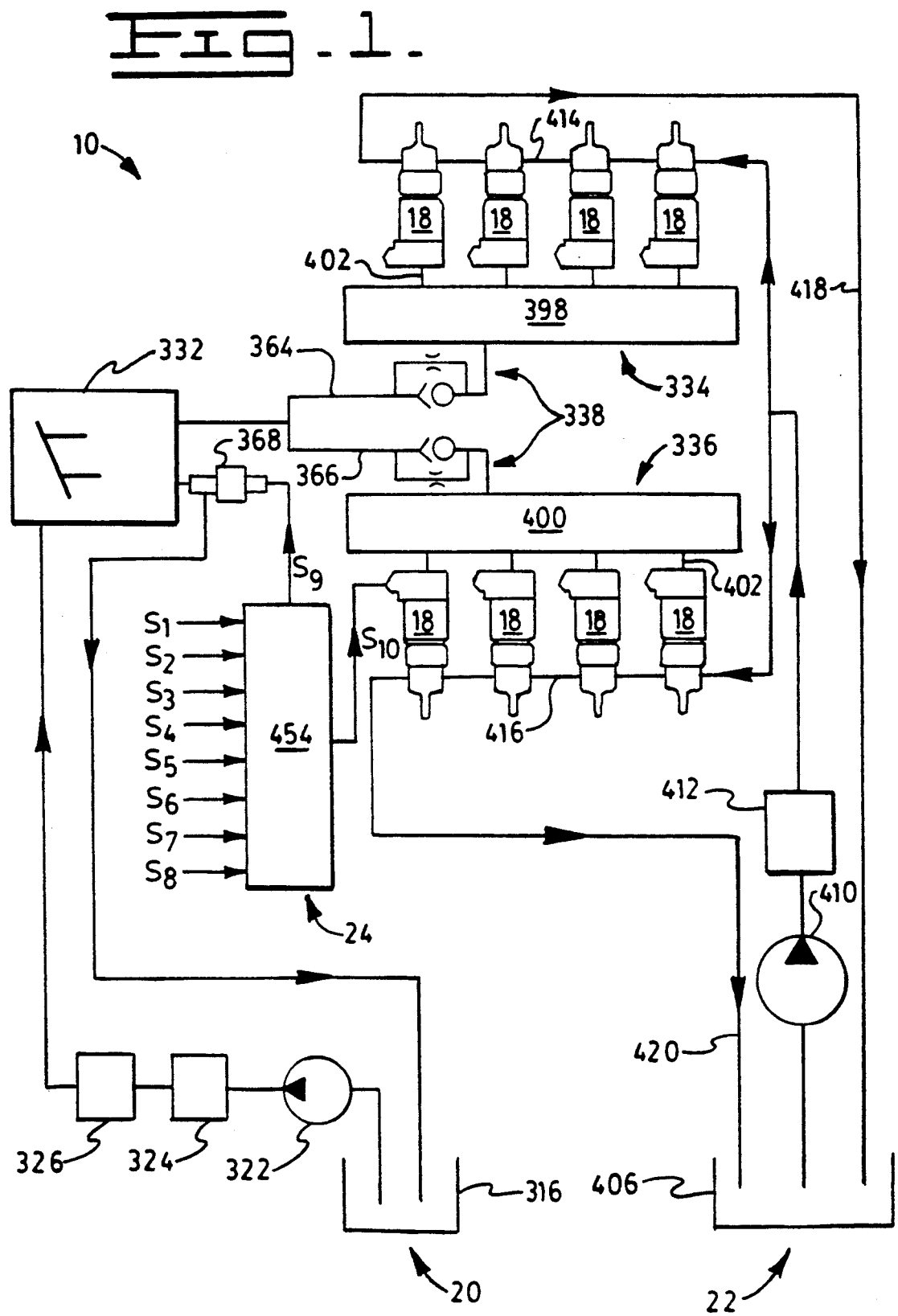
FIG. 1 is a diagrammatic general schematic view of a hydraulically-actuated electronically-controlled unit injector fuel system of the present invention, including both an actuating fluid circuit and a fuel injection circuit, for an internal combustion engine having a plurality of unit injectors.
Figure 12:
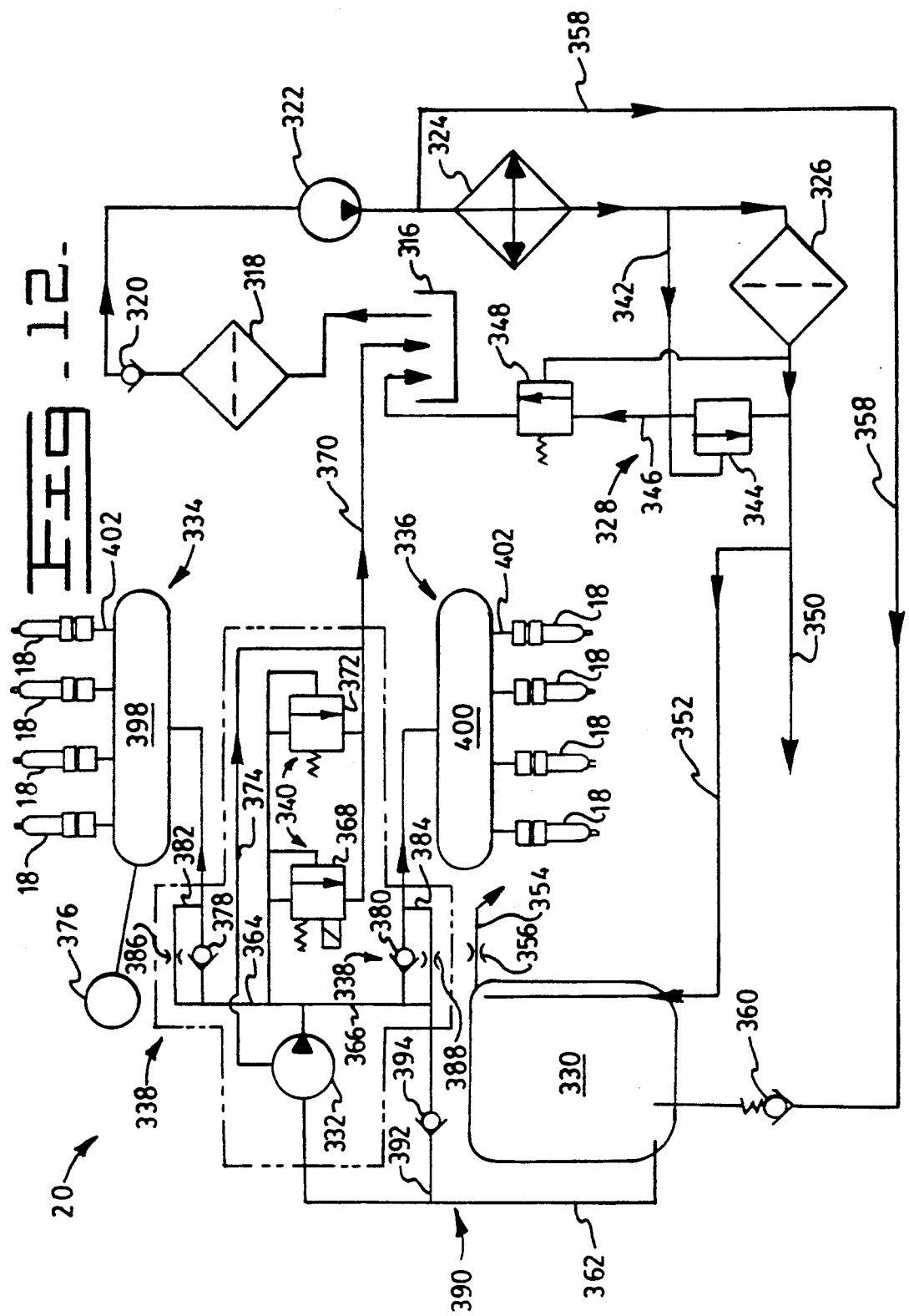
FIG. 12 is a diagrammatic detailed schematic view of the hydraulically actuating fluid and damping fluid supplying means generally shown in FIG. 1.
Figure 13:
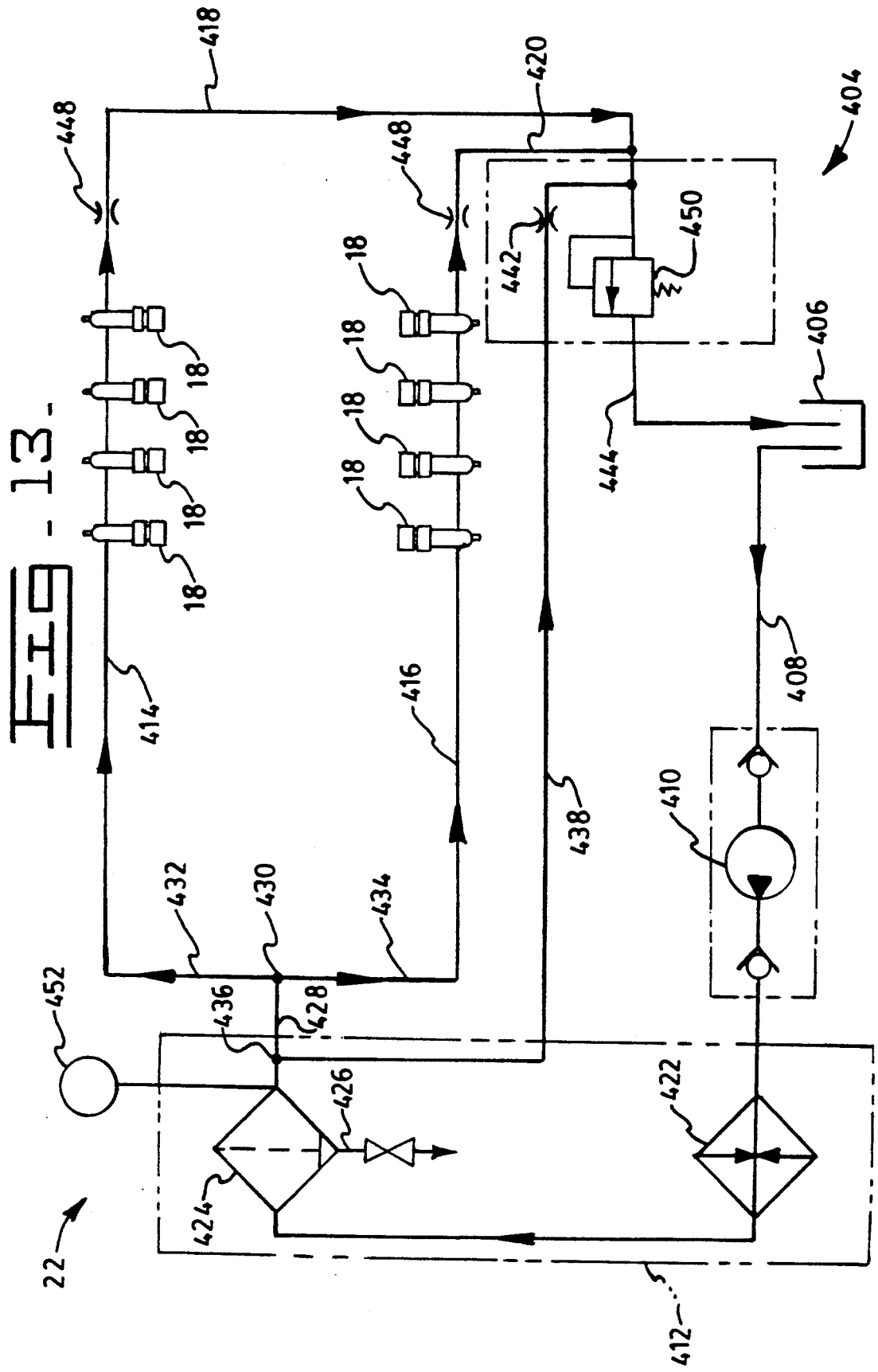
FIG. 13 is a diagrammatic detailed schematic view of the fuel supplying means generally shown in FIG. 1.

Referring to FIGS. 1-13, wherein the same reference numerals designate the same elements or features throughout all of the FIGS. 1-13, a first embodiment of a hydraulically-actuated electronically-controlled unit injector fuel system 10, hereinafter referred to as a HEUI fuel injection system. The exemplary HEUI fuel injection system 10 is shown in FIGS. 1, 2, 12, and 13 as adapted for a diesel-cycle direct-injection internal combustion combustion engine 12. While a vee-type eight cylinder engine is illustrated in FIGS. 1, 12 and 13 and described herein, it should be understood that the invention is also applicable to other types of engines, such as in-line cylinder engines and rotary engines, and that the engine may contain fewer or more than eight cylinders or combustion chambers. The exemplary engine 12, only partially shown in FIG. 2, has a pair of cylinder heads 14. Each cylinder head 14 has one or more (for example, four) unit injector bores 16.

Referring to FIGS. 1 and 2, the HEUI fuel injection system 10 includes one or more hydraulically-actuated electronically-controlled unit injectors 18 adapted to be positioned in a respective unit injector bore 16, means or device 20 for supplying hydraulically actuating fluid and damping fluid to each unit injector 18, means or device 22 for supplying fuel to each unit injector 18, and means or device 24 for electronically controlling the HEUI fuel system 10.

Referring to FIG. 3, each unit injector 18 has a longitudinal axis 26 and includes an actuator and valve assembly 28, a body assembly 30, a barrel assembly 32, and a nozzle and tip assembly 34. The longitudinal axis 26 defines a selected angle A with respect to the axis of the engine combustion chamber.

The actuator and valve assembly 28 is provided as a means or device for selectively communicating either relatively-high-pressure actuating fluid or relatively-low-pressure damping fluid to each unit injector 18 in response to receiving an electronic control signal $S_{10}$ shown in FIG. 1. Referring to FIGS. 3, 4, 6 and 8, the actuator and valve assembly 28 includes an actuator 36, preferably in the form of a solenoid assembly, and a valve 38, preferably in the form of a poppet valve. The solenoid assembly 36 includes a fixed stator assembly 40 and a movable armature 42.

As shown in FIGS. 3 and 6, the stator assembly 40 includes a one or more first fasteners 44, a stator 46, and an electrical connector 48. Although not shown, the stator 46 may, for example, include a stack of individual E-frames and an electrical wire which is wound around the E-frames in a conventional manner.

As shown in FIGS. 4 and 6, the armature 42 has a pair of oppositely-facing planar first and second surfaces 52,54 and a means or device 56 for communicating, collecting and draining damping fluid with respect to expandable and contractible cavities of the solenoid assembly 36. As shown in FIG. 4, the first surface 52 of the armature 42 is spaced from the stator 46 so that the armature 42 and stator 46 collectively define an upper armature cavity 57 or gap therebetween.

Preferably, the communicating, collecting and draining means 56 includes one or more passages 58 which longitudinally extend between the first and second surfaces 52,54. For example, as shown in the FIGS. 4 and 6, the passages 58 are provided in the form of a pair of circular holes. Moreover, the communicating, collecting and draining means 56 further includes one or more elongated collection grooves 60 formed in the first surface 52 of the armature 42 which directly faces the stator 46. Each collection groove 60 laterally extends across the width of the first surface 52 and intersects or communicates with a respective passage 58. For example, as shown in FIGS. 4 and 6, a pair of mutually parallel collection grooves 60 are provided for collecting damping fluid which has been communicated to and has accumulated in the upper armature cavity 57. In an alternative embodiment, passages of elongated or elliptical cross-section may be substituted for the passages 58 of circular cross-section. In another alternative embodiment, the collection grooves 60 may be similarly formed in the portion of the stator 46 facing the first surface 52 of the armature 42 and also communicate with the passages 58 of the armature 42. In other words, the collection grooves 60 may be formed in one of or both the stator 46 and the armature 42. The size and position of each passage 58 and collection groove 60 is carefully selected to ensure that it has a large enough volume to adequately communicate, collect and drain damping fluid with respect to cavities of the solenoid assembly 36, including the upper armature cavity 57, but also small enough to maximize the amount of flux paths in the stator 46 and armature 42 which are necessary for adequate magnetic performance of the solenoid assembly 36.

As shown in FIG. 4, a closely-controlled axial clearance or gap $C_1$ (for example, about 0.377 millimeters or 0.0148 inches) is defined between the armature 42 and the stator 46 when the armature 42 is in its electrically deenergized position. The clearance $C_1$ defines part of the upper armature cavity 57 and helps determine the amount of damping imparted to the movable armature 42 by the damping fluid which is periodically displaced from the clearance $C_1$. The clearance $C_1$ also helps determine the amount of magnetic force imparted by the stator 46 to the armature 42 when the solenoid assembly 36 is electrically energized.

As shown in FIG. 3, as well as FIGS. 2, 4, 6 and 7, the body assembly 30 includes one or more second fasteners 62, an annular armature spacer 64, one or more third fasteners 66, an adapter o-ring seal 68, a poppet adapter 70, an annular unit injector clamp 72, a poppet shim 74, a poppet sleeve or member 76, a poppet spring 78, a piston and valve body 80, an externally-disposed first body o-ring seal 82, an externally-disposed second body o-ring seal 84, an internally-disposed third body o-ring seal 86, and an intensifier piston 88.

The first fasteners 44 threadably connect the stator assembly 40 and armature spacer 64 to the poppet adapter 70. The second fastener 62 threadably connects the armature 42 to the poppet valve 38 so that the armature 42 and poppet valve 38 are displaced together as a unit. The third fasteners 66 threadably connect the poppet adapter 70 to the body 80.

The armature spacer 64 has a thickness, measured along the longitudinal axis 26, which is greater than the thickness of the armature 42 by a selected amount. As shown in FIG. 4, the second surface 54 of the armature 42 is spaced from the poppet adapter 70 so that the armature 42 and poppet adapter 70 stator 46 collectively define a lower armature cavity 89 or gap therebetween. The size and position of each passage 58 and collection groove 60 is carefully selected to ensure that it has a large enough volume to adequately communicate, collect and drain damping fluid with respect to cavities of the solenoid assembly 36, including the lower armature cavity 89, but also small enough to maximize the amount of flux paths in the stator 46 and armature 42 which are necessary for adequate magnetic performance of the solenoid assembly 36. As shown in FIG. 6, the armature spacer 64 has a pair of oppositely-facing planar first and second surfaces 90,92, an inner peripheral surface 94 and an outer peripheral surface 96. As shown in FIG. 4, the first surface 90 of the armature spacer 64 faces and directly contacts the stator assembly 40. The second surface 92 of the armature spacer 64 faces and directly contacts the poppet adapter 70. The second surface 92 of the armature spacer 64 is provided with one or more drain passages or slots 98 formed therein which extend from the inner peripheral surface 94 to the outer peripheral surface 96. Alternatively, the first surface 90 of the armature spacer 64 may be provided with the drain passages or slots 98. During engine operation, the drain passages 98 of the armature spacer 64, in cooperation with the communicating, collecting and draining means 56, drain damping fluid which has been communicated to the upper and lower armature cavities 57,89. The drain passages 98 of the armature spacer 64 are preferably sized to provide a selected restriction to flow of damping fluid during engine operation in order to help facilitate damping of the motion of the armature 42 and poppet valve 38. The drain passages 98 of the armature spacer 64 in cooperation with the communicating, collecting and draining means 56 also drain damping fluid from the upper and lower armature cavities 57,89 after engine shutdown. If the actuating fluid and damping fluid are chosen to be engine lubricating oil, the drain passages 98 of the armature spacer 64 are preferably adapted to communicate with the space enclosed by a cylinder head cover 99 as shown in FIG. 2. The fluid in this space communicates with an actuating fluid sump and is permitted to drain back to that sump.

As shown in FIGS. 4 and 7, the poppet adapter 70 has a longitudinally-extending centrally-disposed main bore 100 formed therethrough. An internally-disposed annular peripheral groove 102 is formed on one end portion of the main bore 100. The poppet adapter 70 also has a counterbore 104 formed on another end portion of the main bore 100. An annular drain passage 106 is defined between the poppet sleeve 76 and the counterbore 104 of the poppet adapter 70. The poppet adapter 70 also has a drain passage 108 defined therein which intersects the annular drain passage 106 and laterally extends to an outer peripheral surface 110 of the poppet adapter 70. If the actuating and damping fluid is chosen to be engine lubricating oil, the drain passage 108 of the poppet adapter 70 is preferably adapted to communicate with the space enclosed by the cylinder head cover 99 as shown in FIG. 2.

As shown in FIG. 4, the lower armature cavity 89 includes a closely-controlled axial clearance or gap $C_2$ (for example, about 0.120 millimeters or 0.00472 inches) is defined between the second surface 54 of the armature 42 and the poppet adapter 70 when the armature 42 is in its electrically deenergized position. The clearance $C_2$ helps define the lower armature cavity 89 and also helps determine the amount of damping imparted to the movable armature 42 by the damping fluid displaced from the clearance $C_2$. The magnitude of the clearance $C_2$ is selected in accordance with the mass of the poppet valve 38 and the type (e.g., viscosity characteristics) of damping fluid used.

The annular unit injector clamp 72 is provided for removably clamping each unit injector 18 to the respective engine cylinder head 14. Preferably as shown in FIG. 7, the clamp 72 has an inner peripheral surface 112, a pair of diametrically-opposed planar first and second surfaces 114,116 defined on the inner peripheral surface 112 in parallel relationship, and a pair of diametrically-opposed semi-cylindrical slots 118,120 formed in the inner peripheral surface 112. Each slot 118,120 is located on an axis which is parallel to and located between the first and second surfaces 114,116. as shown in FIG. 2, each slot 118,120 is adapted to engage a fastener 122,124 which threadably connects the clamp 72 and unit injector 18 to the cylinder head 14 of the engine 12.

As shown in FIG. 3, the poppet shim 74 is positioned between the poppet adapter 70 and the poppet sleeve 76. The poppet shim 74 has a selected thickness which determines the amount of upward lift or displacement of the poppet valve 38.

As shown in FIG. 4, the poppet sleeve 76 is slidably positioned in the main bore 100 of the poppet adapter 70 by a relatively loose fit. The adapter o-ring seal 68 is positioned in the annular clearance between the poppet sleeve 76 and the poppet adapter 70 and is seated in the annular peripheral groove 102 formed in the main bore 100 of the poppet adapter 70. The adapter o-ring seal 68 is provided in order to prevent the annular clearance from communicating actuating or damping fluid directly between the lower armature cavity 89 and the annular drain passage 106. As shown in FIGS. 4 and 7, the poppet sleeve 76 is provided with a centrally-disposed main bore 126 and one or more (preferably two) laterally-extending passages 128 which communicate actuating fluid or damping fluid between the annular drain passage 106 and the main bore 126. The size of the passages 128 are selected so that the passages 128 function as fluid flow restrictions or fixed flow orifices in order to dampen the motion of the poppet valve 38. The poppet sleeve 76 has one end portion which defines an annular (preferably frusto-conical) seat 129 around an entrance to the main bore 126 and an annular shoulder 130.

As shown in FIG. 3, one end of the poppet spring 78 contacts the annular shoulder 130 of the poppet sleeve 76 and the other end of the poppet spring 78 contacts the poppet valve 38. The poppet spring 78 is preferably a helical compression spring and is provided as a means or device for biasing the poppet valve 38 and armature 42 axially away from the stator 46. The poppet spring 78 also biases the poppet sleeve 76 and poppet shim 74 against the fixed poppet adapter 70 such that the poppet valve 38 is normally unseated from the annular seat 129 defined on the poppet sleeve 76.

As shown in FIG. 8, the poppet valve 38 has a first end portion 132, an intermediate portion 134 and a second end portion 136. As shown in FIG. 4, the first end portion 132 contacts the second surface 54 of the armature 42. The first end portion 132 preferably has a reduced diameter, relative to the intermediate portion 134, and cooperates with the poppet sleeve 76 to define an upper poppet valve cavity 138. The upper poppet valve cavity 138 is in direct fluid communication with the lower armature cavity 89.

The intermediate portion 134 of the poppet valve 38 has an annular peripheral surface 140 and one or more (preferably two) passages 142. The annular peripheral surface 140 of the poppet valve 38 is positioned within the main bore 126 of the poppet sleeve 76 according to a selected annular clearance $C_{3a}$. This annular clearance preferably provides a slip fit between the poppet valve 38 and the poppet sleeve 76 and, for example, may be a diametrical clearance of about 0.080 millimeters or 0.00315 inches. The outer peripheral surface of the poppet sleeve 76 is positioned in the main bore 100 of the poppet adapter 70 according to a selected diametrical clearance which is greater than the clearance $C_{3a}$. An upper annular peripheral groove 144 and an annular first or upper seat 146 are defined on the annular peripheral surface 140 of the poppet valve 38. The width of the upper annular peripheral groove 144, measured along the longitudinal axis 26, is sized so that the upper annular peripheral groove 144 of the poppet valve 38 remains in continuous fluid communication with the passages 128 of the poppet sleeve 76 over the entire selected displacement of the poppet valve 38. The shape of the upper seat 146 of the poppet valve 38 is preferably semi-spherical but, alternatively, may be frusto-conical. The poppet valve upper seat 146 is adapted to selectively engage or disengage the annular seat 129 formed on the poppet sleeve 76.

The second end portion 136 of the poppet valve 38 is preferably hollow to define a lower poppet valve cavity 148 shown in FIG. 4. The passages 142 of the poppet valve 38 each have a selected fluid flow restriction therein and communicate damping fluid between the upper poppet valve cavity 138 and the lower poppet valve cavity 148. Part of the second end portion 136 of the poppet valve 38 is closely guided within the body 80 to be discussed below. The second end portion 136 of the poppet valve 38 includes an annular second or lower seat 149, an annular peripheral shoulder 150, and a lower annular peripheral groove 152. The shape of the poppet valve lower seat 149 is preferably frusto-conical. The first and second seats 146,149 each have an effective area exposable to hydraulic pressure.

In one embodiment, the effective area of the first seat 146 is smaller than the effective area of the second seat 149. In that embodiment, the net hydraulic force acting on the poppet valve 38 assists the electrical force of the actuator 36 in moving the valve 38 to from its first position to its third position. In another embodiment, the effective area of the first seat 146 is larger than the effective area of the second seat 149. In that embodiment, the net hydraulic force acting on the poppet valve 38 assists the spring 78 in moving the valve 38 to from its third position to its first position.

Preferably, the poppet sleeve 76 is loosely fitted within the poppet adapter 70 according to selected close positional and diametrical tolerances and the poppet valve 38 is relatively more tightly fitted in the body 80 according to selected close positional and diametrical tolerances. This configuration helps accommodate possible misalignment between the poppet sleeve 76 and the poppet valve 38 as the poppet valve 38 travels along the longitudinal axis 26 of the unit injector 18. The annular shoulder 150 formed on the poppet valve 38 contacts the other end of the poppet spring 78. The lower seat 149 functions as a means for selectively opening or blocking the communication of high pressure actuating fluid to the intensifier piston 88. The upper seat 146 functions as a means for selectively opening or blocking the communication of high pressure actuating fluid to a low pressure drain and the communication of low pressure damping fluid to the upper and lower armature cavities 57,89 and the upper and lower poppet valve cavities 138, 148.

The poppet valve 38 is movable between first, second and third positions. For example, the total axial displacement of the poppet valve 38 in one direction is about 0.25 millimeters or 0.0098 inches. The first position of the poppet valve 38 is defined as the position at which the poppet valve lower seat 149 is normally seated on the body 80 due to the bias of the poppet spring 78. At the first position of the poppet valve 38, the poppet valve upper seat 146 is normally unseated from the annular seat 129 of the poppet sleeve 76 by a selected clearance.

When the stator assembly 40 is electrically energized, the armature 42 is magnetically attracted towards the stator 46 so that the poppet valve 38 moves axially upward (according to the orientation shown in FIG. 3) towards the third position. The third position of the poppet valve 38 is defined as the position at which the upper seat 146 of the poppet valve 38 is seated against the annular seat 129 of the poppet sleeve 76. At the third position of the poppet valve 38, the lower seat 129 of the poppet valve 38 is unseated from the body 80.

Between the first and third positions, the poppet valve 38 assumes the second or intermediate position at which both the lower seat 149 and the upper seat 146 of the poppet valve 38 are unseated from the body 80 and the poppet sleeve 76, respectively. At the second position of the poppet valve 38, actuating fluid is exhausted through the upper annular peripheral groove 144, the passages 128, the annular drain passage 106, and the drain passage 108. Moreover, at the second position of the poppet valve 38, damping fluid is communicated to the lower and upper armature cavities 89,50 via the clearance $C_{3a}$ if the viscosity of the damping fluid is sufficiently low enough.

It is preferable that the clearance $C_{3a}$ be located downstream (i.e., with respect to the actuating fluid inlet passages 158) of the passages 128 of the poppet sleeve 76. Thus, when the poppet valve 38 moves from its third position (i.e, seated on its upper seat 146) and towards its first position, a portion of the actuating fluid in the annular chamber 163 is directed as damping fluid through the clearance $C_{3a}$ while the poppet valve assumes its second position and before the poppet valve 38 assumes its first position (i.e., seated on its lower seat 149).

The solenoid assembly 36 is one of many possible embodiments of an electronically-controlled actuator for selectively displacing the poppet valve 38 from its first position, to its second position, to its third position and vice versa. Alternatively, other types of electronically-controlled actuators, such as a piezoelectric actuator, may be substituted for the solenoid assembly 36.

A valve in the form of the poppet valve 38 provides at least two advantages over a spool valve in this application. First, when unseated, the poppet valve 38 opens up a relatively larger fluid flow area for a small amount of axial displacement. Consequently, the poppet valve 38 generally demands less electrical energy than a spool valve in order to adequately power the actuator 36. Second, the poppet valve 38 seals better than a spool valve since the poppet valve 38 provides a positive seal against each of its seats rather than some amount of diametrical clearance as a spool valve does with respect to a valve body. The poppet valve 38 is also preferably of the single-stage (i.e., one-piece) type. A single-stage valve is advantageous over a two-stage or pilot-operated valve in this application because of lower cost, more flexibility in packaging the unit injector for specific applications, and simplicity of operation.

As shown in FIGS. 3-5 and 8, the body 80 includes a pair of oppositely-facing first and second blind bores 154,156, one or more actuating fluid inlet passages 158, an actuating fluid intermediate passage 160 communicating between the first and second blind bores 154,156, and an external peripheral surface 162. The width of the lower annular peripheral groove 152 Of the poppet valve 38, measured along the longitudinal axis 26, is sized so that it remains in continuous fluid communication with the inlet passages 158 of the body 80 over the entire selected displacement of the poppet valve 38.

The first blind bore 154 of the body 80 faces the armature 42 and is adapted to receive both the second end portion 136 and intermediate portion 134 of the poppet valve 38. The first blind bore 154 of the body 80 and the second end portion 136 of the poppet valve 38 cooperate to define an annular chamber 163. The actuating fluid communicated to the annular chamber 163 is at relatively low pressure when the poppet valve 38 is at its first or second positions. The actuating fluid communicated to the annular chamber 163 is at relatively high pressure when the poppet valve 38 is at its third position. The first blind bore 154 is stepped to define a reduced diameter portion 164 and an annular (preferably frusto-conical) seat 166. The reduced diameter portion 164 of the first blind bore 154 guides the second end portion 136 of the poppet valve 38 according to a closely-controlled selected diametrical clearance $C_{3b}$ which is less than the diametrical clearance $C_{3a}$. The annular seat 166 of the body 80 is adapted to selectively engage and disengage the lower seat 149 of the poppet valve 38.

The second blind bore 156 of the body 80 is adapted to receive the barrel assembly 32 to be discussed below. As shown in FIG. 5, the second blind bore 156 has an internally-disposed annular peripheral groove 168 in which the third body o-ring seal is positioned. The third body o-ring seal 86 is provided as a means or device for positively sealing or isolating the actuating fluid present in the piston pump chamber 190 from the fuel present in the piston chamber 192. This arrangement helps prevent the fuel from diluting the lubricating and viscosity characteristics of the actuating fluid and damping fluid. Alternatively, the third body o-ring seal 86 may be eliminated if the annular peripheral groove 168 functions as a collection space for leakage of actuating fluid which is returned to the actuating fluid sump by a drain passage (not shown). The second blind bore 156 also has a seat 170 formed therein.

As shown in FIGS. 4, 5 and 8, the external peripheral surface 162 of the body 80 includes axially-spaced first, second and third annular peripheral grooves 172,174,176. The external peripheral surface 162 also includes oppositely-facing parallel planar first and second surfaces 178,180 and a pair of transversely-extending shoulders 182,184 formed thereon. The second annular peripheral groove 174 is positioned axially between the first and third annular peripheral grooves 172,176 and defines an annular actuating fluid inlet passage with respect to the cylinder head 14. The first and second body o-ring seals 82,84 are each positioned in the respective first and third annular peripheral grooves 172,176. The second body o-ring seal 84 is provided as a means or device for positively sealing or isolating the actuating fluid in the vicinity of the second annular peripheral groove 174 from the fuel in the vicinity of the barrel assembly.

The planar first and second surfaces 114,116 formed on the clamp 72 are adapted to engage the planar first and second surfaces 178,180 formed on the body 80 in order to properly orient the unit injector 18 relative to the engine cylinder head 14. The clamp 72 also contacts the shoulders 182,184 of the body 80 in order to apply a clamping load thereto when the unit injector 18 is installed in the bore 16 of the cylinder head 14 as shown in FIG. 2.

As shown in FIGS. 3 and 5, the intensifier piston 88 is slidably positioned in the second blind bore 156 of the body 80. As shown in FIG. 9, the intensifier piston 88 is a generally cup-shaped cylinder having an outside diameter $D_1$ which corresponds to an effective cross-sectional pumping area $A_1$. The intensifier piston 88 has a crown portion 186 and a generally hollow cylindrical skirt portion 188. As shown in FIG. 5, the crown portion 186 of the reciprocal intensifier piston 88 and the second blind bore 156 of the body 80 collectively define an expandable and contractible piston pump chamber 190. The skirt portion 188 of the reciprocal intensifier piston 88, the barrel assembly 32 and the second blind bore 156 of the body 80 collectively define a contractible and expandable piston chamber 192. The intensifier piston 88 also has first and second stops 194,196 formed thereon. The first stop 194 is preferably located on a free end of the crown portion 186 and is adapted to engage and disengage the seat 170 of the body 80. The second stop 196 is preferably located on a free end of the skirt portion 188 and is adapted to engage and disengage abutment with the barrel assembly 32.

As shown in FIGS. 3, 5, 9, and 10, the barrel assembly 32 includes a barrel 198, a ring retainer 200, a washer retainer 202, a plunger 204, a plunger spring 206, a one-way flow check valve 208 preferably in the form of a ball check, and an annular spring retainer 210.

As shown in Fig. 5, the barrel 198 includes a precision-formed centrally-disposed longitudinally-extending main bore 212 and an outlet passage 214 communicating with the second blind bore 156 of the body 80. The outlet passage 214 includes an exit end portion having an annular (preferably frusto-conical) seat 216 formed thereon. The barrel 198 also has an outer peripheral surface in which an annular peripheral groove 218 is formed.

One end portion of the barrel 198 facing the intensifier piston 88 serves as a seat 219 for the second stop 196 of the intensifier piston 88. As shown in FIG. 5, a selected axial clearance $C_4$ is provided between the barrel seat 219 and the second stop 196 of the intensifier piston 88 in order to determine the maximum displacement or stroke of the intensifier piston 88.

The check valve 208 is positioned in the outlet passage 214 and is normally biased against the seat 216 by a preload applied by the spring retainer 210. The spring retainer 210 is preferably a split annular member having a hole or indentation formed therein. The spring retainer 210 is positioned in the annular peripheral groove 218 of the barrel 198 so that it encircles not only the check valve 208 but also the barrel 198 as well. The check valve 208 is seated in the relatively smaller hole in order to prevent the spring retainer 210 from rotating around the barrel 198. This prevents the check valve 208 from eventually facing the split portion of the spring retainer 210 where the check valve 208 might work its way out.

Alternatively, the spring retainer 210 may be eliminated by forming an outlet passage that exits the barrel 198 at a selected acute angle (for, example, about 55°). In this alternative embodiment, fluid pressure is relied upon to seat the check valve 208 against the annular seat 216 of the barrel 198.

The plunger 204 is slidably positioned in the main bore 212 of the barrel 198 by a close tolerance fit. The washer retainer 202 is preferably connected to the plunger 204 by an interference fit. Moreover, the washer retainer 202 is fixed to the plunger 204 by the ring retainer 200 which is positioned in an annular peripheral groove 220 of the plunger 204. The plunger 204 has an outside diameter $D_2$ which corresponds to an effective cross-sectional pumping area $A_2$. The diameter $D_1$ of the intensifier piston 88 is larger than the diameter $D_2$ by a selected amount. For example, the ratio of the area $A_1$ to the area $A_2$ is preferably about 7 to 1. This ratio can, of course, be varied to tailor injection characteristics to the needs of a particular engine. The plunger spring 206 is positioned generally concentrically around the plunger 204 between the barrel 198 and the washer retainer 202. The plunger spring 206 is preferably a helical compression spring which biases the plunger 204 and intensifier piston 88 upwardly against the seat 170 of the body 80. Preferably, the body 80 is connected to the barrel 198 in correct angular alignment by a plurality of hardened steel dowels 222 which fit into respective longitudinally-extending dowel holes 224 defined in the body 80 and the barrel 198.

As shown in FIG. 3, the nozzle and tip assembly 34 includes a ball spring 226, a ball spacer 228, a one-way flow check valve 230 preferably in the form of a ball check, a stop member 232, a plurality of hardened steel dowels 234, a stop pin 236, a needle check spring 238, a lift spacer 240, a sleeve 242, a fuel filter screen 244, an annular filter screen retainer 246, a needle check 248, a plurality of dowels 250, a needle check tip 252, a case 254, and first and second case o-ring seals 256,258.

The stop member 232 is axially positioned between the barrel 198 and the sleeve 242. The stop member 232, barrel 198 and plunger 204 collectively define a fuel pump chamber 260. The stop member 232 includes a fuel inlet passage 262 and one or more separate fuel discharge passages 264. Both the inlet passage 262 and the discharge passage(s) 264 communicate with the fuel pump chamber 260. The inlet passage 262 has an internally-disposed annular (preferably frusto-conical) seat 266 generally facing the barrel 198. The check valve 230, ball spacer 228 and ball spring 226 are positioned in the inlet passage 262 so that the ball spacer 228 is positioned between the ball spring 226 and the check valve 230, the ball spring 226 is positioned between the barrel 198 and the ball spacer 228, and the check valve 230 is positioned between the ball spacer 228 and the annular seat 266 of the stop member 232. The ball spacer 228 locates one end of the ball spring 226 in force exerting relation to the check valve 230 and also functions as a positive stop for upward displacement of the check valve 230 towards the barrel 198. The ball spring 226 is preferably a helical compression spring which normally biases the check valve 230 against the annular seat 266. Alternatively, the ball spacer 228 and ball spring 226 may be eliminated from the inlet passage 262 of the stop member 232.

As shown in FIGS. 3 and 5, the sleeve 242 is axially positioned between the stop member 232 and the needle check tip 252. The sleeve 242 has a generally centrally-disposed and longitudinally-extending bore 268, a radially-extending and stepped fuel inlet passage 270 which communicates with the bore 268, and one or more fuel discharge passages 272 which communicate with a respective fuel discharge passage 264 of the stop member 232. The sleeve bore 268 has oppositely-facing first and second counterbores 274,276 and a reduced-diameter guide portion 278 therebetween. The first counterbore 274 communicates with the inlet passage 262 of the stop member 232. The second counterbore 276 provides sufficient fuel volume in order to prevent cavitation when the lift spacer 240 moves upwardly during an injection stroke. The stepped fuel inlet passage 270 defines an internally-disposed annular shoulder 279. The filter screen 244 is positioned within the fuel inlet passage 270 against the annular shoulder 279 and is fixed thereto by the filter screen retainer 246.

As shown in FIG. 3, the lift spacer 240 is axially positioned between the stop pin 236 and the needle check 248. The needle check spring 238 is positioned around the stop pin 236. The stop pin 236, needle check spring 238 and lift spacer 240 are positioned in the sleeve bore 268 so that the needle check spring 238 is preloaded and contacts both the stop member 232 and the lift spacer 240. The needle check spring 238 is also supported by the guide portion 278 of the sleeve bore 268. As shown in Fig. 10, the lift spacer 240 has one or more flats or planar surfaces 280 formed on its outer peripheral surface. The flats 280 provide sufficient radial clearance between the lift spacer 240 and the sleeve bore 268 in order to minimize the adverse pumping effect of the movable lift spacer 240.

As shown in FIG. 3, the needle check tip 252 is positioned between the sleeve 242 and the case 254. As shown in FIGS. 5 and 11, the needle check tip 252 includes a generally centrally-disposed longitudinally-extending blind bore 281, having an internally-disposed annular (preferably frusto-conical) seat 282 defined thereon, one or more discharge passages 283, a cardioid chamber 284, and an annular discharge passage 285. The needle check 248 and needle check tip 252 are preferably of the valve-closed-orifice type. One end portion of the needle check tip 252 defines at least one but preferably a plurality of fuel injection spray orifices 286. The needle check spring 238 normally biases the lift spacer 240 and needle check 248 downwardly so that the needle check 248 is seated against the annular seat 282 of the needle check tip 252. Preferably, the needle check tip 252 further includes an annular seat portion 288, a reduced diameter stem portion 290, and an intermediate diameter guide portion 292 therebetween. The dowels 250 and corresponding dowel holes 296 formed in both the needle check tip 252 and the sleeve 242 connect the needle check tip 252 to the sleeve 242 in correct angular relationship.

The case 254 has multi-stepped longitudinally-extending first, second and third bores 298,300,302, an internally-disposed annular seat 304, an externally-disposed annular seat 306, a fuel inlet passage in the form of one or more radially-extending fuel inlet holes 308, and first and second outer peripheral annular grooves 310,312.

The third bore 298 is located at one end portion of the case 254 between the externally-disposed annular seat 306 and the internally-disposed annular seat 304. The annular seat portion 288 of the needle check tip 252 is seated against the internal annular seat 304 of the case 254 in order to positively seal combustion gas from fuel. The external annular seat 306 of the case 254 is adapted to seal against a seat formed in the unit injector bore 16 of the cylinder head 14 or a sleeve positioned between the unit injector 18 and the unit injector bore 16 of the cylinder head 14. The intermediate diameter guide portion 292 of the needle check tip 252 is positioned entirely within the third bore 302 of the case 254. The elongated reduced diameter stem portion 290 of the needle check tip 252 projects outwardly through the case 254 via the third bore 302. The stepped configuration of the needle check tip 252 is advantageous because it provides sufficient material for strength in the vicinity of the mating seats 288,304 of the needle check tip 252 and the case 254 which is subjected to high stresses caused by high pressure fuel in the cardioid chamber 284. The intermediate diameter guide portion 292 of the needle check tip 252 provides a gradual transition within the envelope of the case 254 to the reduced diameter stem portion 290. Thus, the cylinder head bore through which the reduced diameter stem portion 290 passes can be a relatively small and constant diagram which does not appreciably diminish the strength of the cylinder head 14.

The fuel inlet holes 308 communicate with an annular fuel inlet passage 314 defined by a clearance between an inside wall of the case 254 and outer peripheral surfaces of the barrel 198, stop member 232, and sleeve 242. The fuel inlet holes 308 of the case 254 not only serve as a means or device for admitting fuel into the unit injector but also serve as the sole means or device for temporarily engaging the tangs of a wrench used to tighten the internal screw threads of the case 254 onto the external screw threads of the body 80.

The first and second case o-ring seals 256,258 are positioned in the respective first and second outer peripheral annular grooves 310,312 of the case 254. The first case o-ring seal 256 is provided around an intermediate portion of the unit injector 18 in order to seal actuating fluid from fuel. The second case o-ring seal 258 is provided around a lower end portion of the unit injector 18 in order to seal combustion gas originating from the engine combustion chamber from fuel in the vicinity of the barrel assembly 32.

The cup-shaped case 254 encloses and retains the needle check tip 252, needle check 248, sleeve 242, stop member 232, barrel 198, plunger 204, plunger spring 206 and intensifier piston 88 against the body 80. Preferably the case 254 is removably connected to the body 80 by a threaded connection.

Referring primarily to FIG. 12, but also FIGS. 1 and 2, the hydraulically actuating fluid and damping fluid supplying means 20 comprises a main actuating fluid circuit which preferably includes an actuating fluid sump 316, a pickup screen-type filter 318, a one-way flow check valve 320, an actuating fluid transfer pump 322, an actuating fluid cooler 324, one or more actuating fluid filters 326, a means or device 328 for bypassing actuating fluid with respect to the fluid filters 326, a priming or engine starting reservoir 330, a relatively-high-pressure actuating fluid pump 332, first and second high pressure actuating fluid manifolds 334,336, means or device 338 for controlling the creation of Helmholtz resonance of pressure waves between the manifolds 334,336 and between the pump 332 and either manifold 334,336, and a means or device 340 for controlling the pressure level in the manifolds 334,336.

Preferably, the fluid chosen for the actuating fluid is not fuel but is a liquid fluid having a relatively higher viscosity than fuel under the same conditions. For example, the actuating fluid may be engine lubricating oil. In this example, the actuating fluid sump 316 is the engine lubrication oil sump.

The check valve 320 is provided as an anti-siphon valve in order to help maintain actuating fluid in the circuit. After engine shutdown, the circuit remains primed with sufficient actuating fluid in order to facilitate quick starting of the engine 12.

The transfer pump 322 is of a conventional design. For example, the transfer pump 322 may be a gearotor pump which develops a relatively low pressure (for example, about 413 kPa or 60 psi).

The filters 326 are preferably of the replaceable element type. The filter bypassing means 328 includes a bypass line 342 connected upstream and downstream of the fluid filters 326. The filter bypassing means 328 further includes a filter bypass valve 344, positioned in the bypass line 342, and a return line 346 connected between the bypass line 342 and the sump 316. The filter bypassing means 328 further includes an actuating fluid pressure regulator 348 positioned in the return line 346.

During engine operation, if the fluid filters 326 become plugged with debris, the pressure downstream of the fluid filters 326 will begin to decrease. If that pressure falls below a selected level (for example, about 138 kPa or 20 psi), the filter bypass valve 344 is activated which permits the actuating fluid to bypass the fluid filters 326 and continue flowing towards the priming reservoir 330. The pressure regulator 348 is provided as a means for preventing the actuating fluid which is upstream of the pump 332 from exceeding a selected pressure (for example, about 345 kPa or 50 psi). If that selected pressure is exceeded, the excess actuating fluid is returned to the sump 316.

Downstream of the fluid filters 326, the actuating fluid is split into first and second branch passages 350,352 if engine lubricating oil is chosen as the actuating fluid. Most of the lubricating oil flows (for example, about 57 liters per minute or 15 gallons per minute) into the first branch passage 350 which supplies the engine lubricating system (not shown). The remainder of the lubricating oil (for example, about 15 liters per minute or 4 gallons per minute), amounting to about 25-33% of the total flow, flows into the second branch passage 352 which communicates with the priming reservoir 330 of the main actuating fluid circuit.

The priming reservoir 330 is provided as a means for priming and thereby facilitating rapid pressurization of the high pressure pump 332 during engine startup. The priming reservoir 330 is positioned upstream of the pumping chamber(s) of the high pressure pump 332 and is arranged in closer fluid communicating proximity to the pump 332 than to the separate sump 316. For example, the priming reservoir 330 may be integrally formed with a front cover (not shown) of the engine 12. Alternatively, the priming reservoir 330 may be integrally formed with the high pressure pump 332. At or near the highest elevation of the fluid level of the priming reservoir 330 there is a return line 354 with a selected flow restriction 356 therein. Preferably, the flow restriction 356 is a fixed flow area orifice. The return line 354 and flow restriction 356 are provided in order to bleed air from the priming reservoir 330 and direct the air back to the sump 316 where it may be vented to atmosphere.

Upstream of the cooler 324 is a cooler/filter bypass line 358 which completely bypasses the cooler 324 and fluid filters 326 and communicates directly with the priming reservoir 330. The cooler/filter bypass line 358 is provided as a means or device for automatically making up or replenishing any actuating fluid that is deficient in the priming reservoir 330 during cold engine operating conditions when the viscosity of the actuating fluid is relatively higher. The cooler/filter bypass line 358 has a one-way flow check valve 360 disposed therein.

During cold temperature operation of the hydraulically actuating fluid and damping fluid supplying means 20, the check valve 360 opens fluid flow through the cooler/filter bypass line 358 and towards the priming reservoir 330 if the fluid pressure in the priming reservoir 330 is less than the fluid pressure in the outlet of the transfer pump 322 by a selected amount. This difference in pressure causes the check valve 360 to open to some corresponding extent and feed a portion or all of the actuating fluid directly to the priming reservoir 330 without being filtered. Flow through the cooler/filter bypass line 358 is activated whenever the second passage 352 leading to the priming reservoir 330 is not able to completely fill the priming reservoir 330. When the pressure in the priming reservoir 330 reaches a selected level relative to the outlet of the transfer pump 322, the check valve 360 is closed and flow of completely filtered actuating fluid is resumed to the priming reservoir 330.

At or near the bottom (lowest elevation) of the priming reservoir 330, there is a pump supply passage 362 which is connected to an inlet of the high pressure pump 332. Preferably, the highest level or elevation of the actuating fluid in the priming reservoir 330 is higher than the highest level of actuating fluid in the pumping chamber(s) of the high pressure pump 332 in order to ensure that the high pressure pump 332 remains completely primed with actuating fluid.

Preferably, in order to minimize cost, the high pressure pump 332 is a fixed displacement axial piston pump which is mechanically driven by the engine 12. The high pressure pump 332 operates in conjunction with a primary variable pressure regulator to be discussed below. Alternatively, the high pressure pump 332 may be a variable displacement axial piston pump without the primary variable pressure regulator. In a HEUI fuel injection system 10 for a vee-type engine 12, the high pressure pump 332 is preferably located at the front of the engine 12 at or near the apex of the vee formed by the pair of cylinder heads 14. The outlet of the high pressure pump 332 communicates with first and second manifold supply passages 364,366. Each of the first and second manifold supply passages 364,366 communicates with a respective manifold 334,336.

Preferably, the manifold pressure controlling means 340 includes an electronically-controlled primary pressure regulator 368. The primary pressure regulator 368 is connected between the outlet of the high pressure pump 332 and a return line 370 which communicates with the sump 316. The primary pressure regulator 368 is provided as a means or device for varying the pressure in the manifolds 334,336 between selected limits (for example, about 2067 to 20670 kPa or 300 to 3000 psi). By varying the actuating fluid pressure in the manifolds 334,336, the injection pressure of the fuel delivered by the unit injectors 18 is consequently varied. The manifold pressure controlling means 340 further includes a pressure relief valve 372 which backs up the primary pressure regulator 368 and protects the manifolds 334,336 from exceeding a selected pressure (for example, about 27560 kPa or 4000 psi.

When activated, the primary pressure regulator 368 and/or pressure relief valve 372 direct excess actuating fluid through the return line 370 that communicates with the sump 316. Fluid leakage in the high pressure pump 332 is communicated through a case drain passage 374 which is connected to the return line 370 communicating with the sump 316. An actuating fluid pressure sensor 376 is provided in at least one of the manifolds 334,336 and sends a signal $S_6$ back to the electronic controlling means 24.

The Helmholtz resonance controlling means 338 includes a one-way flow check valve 378,380 positioned in each of the first and second manifold supply passages 364,366 connecting the high pressure actuating fluid pump 332 with each of the manifolds 334,336. The Helmholtz resonance controlling means 338 further includes a bypass line 382,384 having a selected flow restriction 386,388 therein which is connected in parallel with each check valve 378,380. Alternatively, the selected flow restriction 386,388 may be integrally formed with the check valve 378,380 to constitute an orificed check valve. Preferably, each flow restriction 386,388 is a fixed flow area orifice but, alternatively, may a variable flow area orifice.

The Helmholtz resonance controlling means 338 is provided in order to controllably minimize or prevent the creation of Helmholtz resonance of pressure waves which would naturally occur between the two interconnected high pressure manifolds 334,336 and also the pump 332 and either manifold 334,336. Controlling Helmholtz resonance helps to maintain a more uniform pressure over time in each manifold 334,336 at a constant pressure setting of the primary pressure regulator 368. The check valves 378,380 isolate fluid communication from one manifold to the other. The bypass line 382,384 and flow restrictions 386,388 minimize fluid communication from one manifold 334,336 to the other which dissipates fluid energy released when its respective check valve 378,380 is closed. The bypass lines 382,384 and flow restrictions 386,388 also perform three other functions. First, they function as a means or device for bleeding down the pressure in each manifold 334,336 during engine operation after the electronic control module 454 signals the primary pressure regulator 368 to lower the pressure in the manifolds 334,336. They also function as a means or device for bleeding down the high pressure in the manifolds after engine shutdown so that the unit injectors 18 may be removed for servicing without spilling actuating fluid from the engine 12. Moreover, if the actuating fluid was not bled down from the manifolds 334,336 after engine shutdown and upon restarting the engine 12, the unit injectors 18 would tend to produce black smoke or other undesirable emissions and also cause a very audible knocking noise. Second, they function as a means or device for equalizing the pressure of the actuating fluid communicated to both the first and second manifolds (334,336) during operation of the fuel injection system (10). Third, they form part of the hydraulic makeup circuit described immediately below. The flow area of each flow restriction 386,388 and mass and displacement of the check valves 378,380 are chosen in accordance with the system pressure, flow requirements, operating frequency, and hydraulic configuration of the HEUI fuel injection system 10.

The actuating fluid circuit also includes a means or device 390 for automatically making up or replenishing the void in each manifold 334,336 which appears after engine shutdown due to cooling and contraction of actuating fluid and/or precipitation of entrained air from the actuating fluid. Without the compensating effect of the making up means 390, the lost volume of actuating fluid in each manifold 334,336 would delay engine startup until the high pressure pump 332 is able to refill the lost volume in the manifolds 334,336. The making up means 390 preferably includes an actuating fluid siphon passage 392. The siphon passage 392 bypasses the inlet of the high pressure pump 332 and is connected directly between the priming reservoir 330 and the manifolds 334,336. The siphon passage has a one-way flow check valve 394 therein which permits flow from the priming reservoir 330 to the manifolds 334,336. The making up means 390 also includes the bypass lines 382,384 and flow restrictions 386,388 which supply actuating fluid to a respective manifold 334,336.

Preferably, one actuating fluid manifold 334,336 is provided for and associated with each cylinder head 14 having a bank of unit injectors 18. For example, in a vee-type engine 12, two actuating fluid manifolds 334,336 are provided. In the embodiment shown in FIG. 2, each actuating fluid manifold 334,336 is integrally formed with an air intake manifold 396 and this combined unit is bolted or otherwise connected to the respective cylinder head 14. Alternatively, each actuating fluid manifold 334,336 may be a separate component which is connected to the respective cylinder head 14. Alternatively, each actuating fluid manifold 334,336 may be integrally formed with the respective cylinder head 14. One advantage of integrating the actuating fluid manifolds 334,336 as internal passages of the engine 12 is the elimination of external high pressure actuating fluid lines which would add cost and complicate assembly and reliability of the HEUI fuel injection system 10 relative to the engine 12. Another advantage is the neater or relatively uncluttered and more esthetically appealing appearance of the engine 12 which makes it easier to access for service or repair. The uncluttered appearance of the engine also makes it easier to adapt or install for various applications.

Each actuating fluid manifold 334,336 has one common rail passage 398,400 and a plurality of rail branch passages 402 communicating with the common rail passage 398,400. The number of rail branch passages corresponds to the number of unit injectors 18 positioned in each cylinder head 14. Each common rail passage 398,400 extends across the respective cylinder head (14) in spaced and parallel relation to the entire bank of unit injectors 18 positioned in each cylinder head 14. As shown in FIG. 2, each of the rail branch passages 402 also communicates with a respective unit injector bore 16 formed in the cylinder head 14 and the second annular peripheral groove 174 defined in the respective unit injector 18. The annular peripheral groove 174 of the unit injector 18 and bore 16 define an annulus which ensures that the high pressure actuating fluid communicated by the rail branch passage 402 to the unit injector 18 exerts a substantially uniform or balanced pressure all the way around the outer periphery of the unit injector 18. This prevents the unit injector 18 from experiencing an unbalanced high pressure side load if there were no annulus between the rail branch passage 402 and the actuating fluid inlet passages 158 of the unit injector 18.

Referring primarily to FIG. 13, but also FIGS. 1 and 2, the fuel supplying means 22 comprises a fuel injection circuit 404 which includes a fuel tank 406, a fuel supply line 408, a fuel transfer and priming pump 410, a means or device 412 for conditioning the fuel, a fuel manifold 414,416 provided for and associated with each cylinder head 14, and one or more fuel return lines 418,420.

Preferably, the fuel conditioning means 412 includes a fuel heater 422, a fuel filter 424, and a fuel/water separator 426. Fuel is drawn by the fuel transfer pump 410 from the tank 406 and flows through the fuel conditioning means 412 where it is heated to a selected temperature, filtered, and separated from water. The fuel conditioning means 412 has a fuel outlet passage 428 which is connected to a tee 430. The tee 430 divides the fuel flow into two portions and communicates with a pair of fuel manifold supply passages 432,434. Each fuel manifold supply passage 432,434 communicates with a respective fuel manifold 414,416 defined in each of the cylinder heads 14. As shown in FIG. 2, each fuel manifold 414,416 is in the form of a common fuel rail passage which is preferably formed as an internal passage of the respective cylinder head 14. Each common fuel rail passage partially but directly intersects each unit injector bore 16 associated with that cylinder head 14 and communicates with the second annular peripheral groove 174 of the unit injector 18 associated with that unit injector bore 16.

The fuel conditioning means 412 further includes another tee 436 positioned upstream of the tee 430 at a location which is preferably at or near the highest point or elevation in the fuel flow circuit. One branch of the another tee 436 is connected to an air-bleed return passage 438 which returns trapped air back to the fuel tank 406. The air-bleed return passage 438 may include a selected flow restriction 442 in order to minimize the amount of fuel flow through the air-bleed return passage 438. As shown in FIG. 13 but not FIG. 1, the fuel return lines may merge into a common return line 444 which communicates with the fuel tank 406. A selected flow restriction 448, preferably in the form of a fixed flow area orifice, is positioned near the outlet of each fuel manifold 414,416 in order to help maintain the pressure in that fuel manifold at a selected pressure (for example, about 276 to 413 kPa or 40 to 60 psi) during engine operation. Moreover, a pressure regulator 450 which may also function as an anti-siphon valve may be positioned in the return line 444 as a substitute for or as an addition to the individual flow restriction 448. The fuel conditioning means 412 may also include a warning device 452 in the form of a light and/or alarm visible to an engine operator which indicates when the fuel filter 424 requires servicing.

Referring to FIG. 1, the electronic controlling means 24 includes a programmable electronic control module 454 and a means or device for detecting at least parameter and generating a parameter indicative signal ($S_{1-5,7-8}$), hereinafter referred to as an input data signal, which is indicative of the parameter detected. The detecting and generating means preferably includes one or more conventional sensors or transducers which periodically detect one or more parameters such as engine and/or transmission operating conditions and generate corresponding input data signals which are sent to the electronic control module 454. Preferably, such input data signals include engine speed $S_1$, engine crankshaft position $S_2$, engine coolant temperature $S_3$, engine exhaust back pressure $S_4$, air intake manifold pressure $S_5$, and throttle position or desired fuel setting $S_7$. Moreover, if the engine 12 is coupled to an automatic transmission, the input data signals may also include a transmission operating condition indicative signal $S_8$ which, for example, indicates the gear setting of the transmission.

The electronic control module 454 is programmed with various multi-dimensional control strategies or logic maps which take into account the input data and then compute a pair of desired or optimal output control signals $S_9,S_{10}$. One output control signal $S_9$ is the actuating fluid manifold pressure command signal. This signal is directed to the primary pressure regulator 368 in order to adjust the output pressure of the pump 332 which in turn adjusts the pressure of the actuating fluid in the manifolds 334,336 to a desired amount. Adjustment of the actuating fluid pressure has the effect of directly adjusting the fuel injection pressure independent of engine speed. Thus, the output control signal $S_9$ can also be considered the fuel injection pressure command signal.

Accurate control of the actuating fluid pressure helps ensure accurate control of fuel injection timing and quantity. In order to accurately control the actuating fluid pressure, a closed-loop feedback circuit is provided. A sensor is provided for detecting the pressure of the hydraulically actuating fluid supplied to the unit injectors 18 and for generating a pressure indicative signal $S_6$ indicative of the pressure detected. The sensor is preferably positioned in at least one of the manifolds 334,336 and periodically samples the actual pressure. Preferably, the frequency of sampling is selected in order to detect a mean or average pressure which is not too sensitive to insignificant transient effects. The sensor generates a corresponding input data signal $S_6$ which is sent to the electronic control module 454. The electronic control module 454 compares the actual actuating fluid pressure with the desired or optimal setting and makes any necessary correction to the output control signal $S_9$.

The other output control signal $S_{10}$ is the fuel delivery command signal which is supplied to the electronic actuator assembly 36 of each selected unit injector 18. The fuel delivery command signal $S_{10}$ determines the time for starting fuel injection and the quantity of fuel injected during each injection phase. Preferably, the fuel delivery command signal produced by the electronic control module 454 is fed to an electronic drive unit (not shown). The electronic drive unit produces a selected waveform that is directed to the actuator assembly 36 of the unit injector 18.

For example, the waveform produced by the electronic drive unit may be a two-step function. The first step of the function may be a signal of about seven amperes which is sufficient to rapidly move the armature 42 and poppet valve 38 to their third position which permits communication of high pressure actuating fluid to the intensifier piston 88. The second step of the function may be a relatively smaller magnitude signal of about half of the magnitude of the first step (e.g., about 3.5 amperes), which is sufficient to maintain the armature 42 and poppet valve 38 in their third position until the fuel delivery command signal is ended by the electronic control module 454. Preferably the electronic control module 454 directly drives the primary pressure regulator 368 without the need for an intermediate electronic drive unit.

INDUSTRIAL APPLICABILITY

The HEUI fuel injection system 10 uses an actuating and damping fluid which is separate from the fuel used for injection into the engine 12. The advantages of using engine lubricating oil rather than fuel as the source for the actuating fluid and damping fluid are as follows. Engine lubricating oil has a higher viscosity than fuel and therefore the high pressure actuating fluid pump 332 and body assembly 30 of the unit injector 18 do not require the degree of precision clearances or additional pumping capacity that would be required in order to pump fuel without excessive leakage particularly when starting an engine when the fuel is still relatively hot. The engine lubricating oil provides better lubrication than does, for example, diesel fuel. Such lubrication is especially needed in the guide and seats of the poppet valve 38. The engine lubricating oil is also able to utilize the oil drain paths to the sump 316 that normally exist in a conventional engine whereas fuel used as actuating and damping fluid would require additional passages or external lines for draining that fuel back to the fuel tank. Such oil drain paths as the relatively large air space within the cylinder head cover 99 do not present a restriction to flow. Thus, at the end of injection, the pressure spike which naturally occurs is quickly dissipated rather than possibly being reflected back to the solenoid assembly 36 where it could damage relatively delicate components. The venting of high pressure actuating fluid in drain paths which are separate from the fuel supply paths helps prevent variation in fuel delivery and timing of injection between various unit injectors 18.

An efficient method or strategy for starting the engine 12 will now be described. While the engine 12 is initially cranked by an auxiliary power source, such as a battery and starter motor (not shown), the electronic control module 454 monitors the actuating fluid manifold pressure $S_6$. The electronic control module 454 is programmed so that it does not electrically energize the solenoid assembly 36 of any unit injector 18 with a fuel delivery command signal $S_{10}$ until the actuating fluid manifold pressure $S_6$ increases to at least a selected minimum pressure level. During this time, the cranking engine 12 mechanically drives the high pressure actuating fluid pump 332 to rapidly build up pressure in the actuating fluid manifolds 334,336 which serve as pressure accumulators.

Preferably, the selected minimum pressure level of the actuating fluid necessary to trigger energization of the unit injectors 18 is that minimum pressure required to actuate at least one fuel injection by a unit injector 18. The selected minimum pressure level varies with the temperature or viscosity of the actuating fluid and generally would be higher under cold engine starting conditions compared to hot engine starting conditions. The selected minimum pressure level also depends on the actual hydraulic configuration of the unit injector 18 which covers parameters such as the nozzle opening pressure of the nozzle and tip assembly 34 and the pressure intensification ratio between the intensifier piston 88 and the plunger 204.

A sensor (not shown) for detecting the temperature or viscosity of the actuating fluid may be provided. Alternatively, the sensor may detect another engine parameter, such as engine coolant temperature, which indirectly indicates the temperature or viscosity of the actuating fluid. In either embodiment, the temperature or viscosity indicative signal generated by the sensor is sent to the electronic control module 454 which then determines or selects an appropriate minimum pressure level according to the temperature or viscosity indicative signal. After at least one unit injector 18 has injected fuel, the engine 12 fires so that the engine speed rapidly increases resulting in increased pumping efficiency of the high pressure pump 332. An advantage of the above engine starting strategy is the ability to minimize the size (i.e., pumping capacity) of the high pressure actuating fluid pump 332 based on what is required to achieve quick engine starts. Minimizing the size of the pump 332 reduces cost and also parasitic horsepower losses of the engine 12 The above engine starting strategy is applicable to any hydraulically actuated fuel system, including the HEUI fuel injection system 10, utilizing oil, fuel or some other fluid as the actuating fluid.

Various alternative methods of starting the fuel system 10 or engine 12 will now be discussed. A first alternative method comprises the step of cranking the engine 12 so that the pump 332 is pressurizing actuating fluid used to hydraulically actuate a plurality of hydraulically-actuated electronically-controlled unit injectors 18. The method further comprises the step of the electronic control module 454 electrically actuating each unit injector 18 sequentially one at a time to cause fuel injection only after a selected period of time has elapsed during pressurization of the actuating fluid. A second alternative method comprises the steps of pressurizing actuating fluid used to hydraulically actuate a plurality of hydraulically-actuated electronically-controlled unit injectors, electrically actuating a selected number of unit injectors sequentially one at a time to cause fuel injection only after a selected period of time has elapsed during pressurization of the actuating fluid, and electrically actuating all the unit injectors sequentially one at a time to cause fuel injection after the fuel system 10 or engine 12 is started. A third alternative method comprises the steps of pressurizing actuating fluid used to hydraulically actuate a plurality of hydraulically-actuated electronically-controlled unit injectors, electrically actuating a selected number of unit injectors sequentially one at a time to cause fuel injection during startup of the fuel system 10 or engine 12, and electrically actuating all the unit injectors sequentially one at a time to cause fuel injection after the fuel system 10 or engine 12 is started. A fourth alternative method comprises the steps of pressurizing actuating fluid used to hydraulically actuate a plurality of hydraulically-actuated electronically-controlled unit injectors, electrically actuating a selected number of unit injectors sequentially one at a time to cause fuel injection only after a selected period of time has elapsed during pressurization of the actuating fluid, and gradually increasing the number of unit injectors that are electrically actuated sequentially one at a time to cause fuel injection. If the fuel system 10 or engine 12 stalls, the number of unit injectors 18 that are electrically actuated sequentially one at a time may be decreased and the method of starting is repeated.

The operation of one unit injector 18 after engine startup will now be described. Referring to FIGS. 1, 2 and 13, fuel is supplied at a relatively low pressure (for example, about 276 to 413 kPa or 40 to 60 psi) to the unit injector 18 by the respective fuel manifold 416. Referring to FIGS. 3 and 5, the fuel flows through the case fuel inlet holes 308, the annular passage 314, the sleeve fuel inlet passage 270, the fuel filter screen 244, and then the sleeve bore 268. The relatively-low-pressure fuel unseats the check valve 230 in opposition to the force of the compressed ball spring 226 when the solenoid assembly 36 is in its de-energized state and the pressure in the fuel pump chamber 260 is lower than the pressure upstream of the check valve 230 by a selected amount. While the check valve 230 is unseated, the fuel pump chamber 260 is refilled with fuel.

While the solenoid assembly 36 is in its de-energized state, the poppet valve 38 is at its first position blocking fluid communication between the actuating fluid inlet passage 158 and the piston pump chamber 190 while opening communication between the piston pump chamber 190 and the upper annular peripheral groove 144, passage 128 and drain passage 108 that communicate with the sump 316. With negligible fluid pressure in the piston pump chamber 190, the plunger spring 206 pushes upwardly against the plunger 204 and intensifier piston 88 so that the first stop 194 contacts the seat 170.

In order to start injection, a fuel delivery command signal $S_{10}$ is generated by the electronic control module 454 and delivered to the electronic drive unit. The electronic drive unit generates a preselected waveform to the solenoid assembly 36 of a selected unit injector 18. The solenoid assembly 36 is electrically energized so that the armature 42 is magnetically drawn towards the stator 46.

The poppet valve 38 is also pulled by the moving armature 42. The poppet valve 38 initially moves to its second position where its lower seat 149 opens fluid communication between the actuating fluid inlet passage 158 and the piston pump chamber 190 while maintaining fluid communication between the piston pump chamber 190 and the upper annular peripheral groove 144, passage 128 and drain passage 108. During this portion of the displacement of the poppet valve 38, the relatively-high-pressure actuating fluid communicated from the inlet passage 158 is reduced to relatively low pressure in the annular chamber 163 and a portion of it is exhausted back to the sump 316 through the restricted passages 128 of the poppet sleeve 76. During hot engine operating conditions, a portion of the depressurized actuating fluid is used as damping fluid which can leak past the clearance $C_{3a}$ in order to decelerate the velocity of the poppet valve 38 as it approaches its third position. Moreover, damping fluid which is displaced from the upper poppet valve cavity 138 to the lower poppet valve cavity 148 via the restrictive passages 142 also tends to decelerate the velocity of the poppet valve 38 as it approaches its second and third positions.

While the poppet valve 38 moves from its first position to its second position, the restricted passages 128 function as a means or device for permitting some buildup of pressure in the piston pump chamber 190 but also for draining enough fluid flow to the sump 316 so that the start of fuel injection is delayed. This sequence of operation ensures that the transitory and somewhat unpredictable initial motion of the poppet valve 38 from its stationary first position to its second position is isolated with respect to or does not coincide with the time period at which fuel injection starts. The chosen size of the restrictive passages 128 is a compromise between being large enough to quickly terminate fuel injection when the poppet valve 38 moves from its third position to its second position and being small enough to minimize the waste of actuating fluid being drained back to the sump 316 while the poppet valve 38 moves from its first position to its second position.

The poppet valve 38 continues to move to its third position where the lower seat 149 continues opened fluid communication between the inlet passage 158 and the piston pump chamber 190 while the upper seat 129 blocks fluid communication between the piston pump chamber 190 and the upper annular peripheral groove 144, passage 128 and drain passage 108. Actuating fluid at a relatively high pressure (for example, about 20670 kPa or 3000 psi) which flows through the inlet passage 158 is trapped in the annular chamber 163, intermediate passage 160 and piston pump chamber 190 and thereby hydraulically exerts a driving force on the intensifier piston 88.

High pressure actuating fluid which may leak from the inlet passages 158 and through the closely controlled clearance between the second end portion 136 of the poppet valve 38 and the reduced diameter guide portion 164 of the body 80 communicates with the lower poppet valve cavity 148, the passages 142, the upper poppet valve cavity 138, the lower armature cavity 89, and the drain passages 98 of the armature spacer 64.

The one-way check valve 208, in cooperation with the reciprocal intensifier piston 88, is provided as an inexpensive and easy to assemble means or device for positively evacuating fuel from the piston chamber 192 during a downward pumping stroke of the intensifier piston 88. Such fuel tends to leak into the piston chamber 192 in between successive pumping strokes of the intensifier piston 88 and plunger 204 by way of the closely controlled annular clearance between the plunger 204 and the main bore 212 of the barrel 198. Any fuel leakage which collects in the piston chamber 192 is effectively pumped out through the one-way check valve 208 by the downward motion of the intensifier piston 88. The fuel which is evacuated from the piston chamber 192 in this manner is prevented by the one-way check valve 208 from directly reentering the piston chamber 192. The evacuation of fuel in the piston chamber 192 during engine operation eliminates or minimizes fluid resistance or fluid pressure therein which would have adversely affected the intended motion of the intensifier piston 88 and plunger 204. Moreover, large pressure pulses generated in the piston chamber 192 by the downward motion of the intensifier piston 88 are minimized or eliminated. The elimination of such large pressure pulses helps prevent damage to fuel filters located upstream of the unit injector 18 and also possible uncontrolled variations in fuel injection rate among other unit injectors 18 of the engine.

The high pressure actuating fluid displaces the intensifier piston 88 and plunger 204 in opposition to the force generated by the compressed plunger spring 206. The fuel trapped in the fuel pump chamber 260 is pressurized to a level which is a function of the pressure of the actuating fluid in the intensifier piston pump chamber 190 and the ratio of effective areas $A_1/A_2$ between the intensifier piston 88 and the plunger 204. This pressurized fuel flows from the fuel pump chamber 260 and through the discharge passages 264,272,283,285 where it acts on the needle check 248 in opposition to a preload exerted by the needle check spring 238. The pressurized fuel lifts the needle check 248 after a selected pressure level is reached and the highly pressurized fuel is injected through the injection spray orifices 286.

In order to end injection or control the quantity of fuel injected, the electronic control module 454 discontinues its fuel delivery command signal $S_{10}$ to the electronic drive unit. The electronic drive unit then discontinues its waveform thereby electrically de-energizing the solenoid assembly 36 of the selected unit injector 18. The absence of the opposing magnetic force allows the compressed poppet spring 78 to expand causing both the armature 42 and poppet valve 38 to move back to their first position. The poppet valve 38 passes through its second position where its lower seat 149 opens fluid communication between the inlet passage 158 and the piston pump chamber 190 while maintaining fluid communication between the piston pump chamber 190 and the upper annular peripheral groove 144, passage 128 and drain passage 108. During this portion of the displacement of the poppet valve 38, the actuating fluid communicated from the inlet passage 158 is depressurized and all or a portion of it is exhausted directly back to the sump 316. During hot engine operating conditions, the depressurized actuating fluid is used as damping fluid which can leak past the clearance $C_{3a}$ in order to decelerate the velocity of the poppet valve 38 as it approaches its first position.

At the first position, the lower seat 149 of the poppet valve 38 seats on the annular valve seat 166 of the body 80 which blocks high pressure actuating fluid from communicating with the piston pump chamber 190. Moreover, the upper seat 146 of the poppet valve 38 is unseated from the annular seat 129 of the poppet sleeve 76 thereby communicating the piston pump chamber 190 with the the upper annular peripheral groove 144, passage 128 and drain passage 108.

Once the piston pump chamber 190 is in fluid communication with the annular peripheral groove 144, passage 128 and drain passage 108, the fluid pressure acting on the intensifier piston 88 also decreases thereby stopping downward displacement of the intensifier piston 88 and plunger 204. The compressed plunger spring 206 then expands thereby returning the plunger 204 and intensifier piston 88 against the seat 170 of the body 80. The pressure in the expanding fuel pump chamber 260 decreases which allows the compressed needle check spring 238 to move the needle check 248 downwardly against its seat 282. The decreased pressure in the fuel pump chamber 260 also allows the check valve 230 to unseat thereby permitting the fuel pump chamber 260 to refill with fuel.

During cold engine startup conditions, the viscosity of the actuating fluid is relatively high if the actuating fluid is chosen to be engine lubricating oil. The presence of cold and very viscous actuating fluid in the clearances $C_1$, $C_2$ is undesirable because it can impede or completely restrain the motion of the armature 42 and poppet valve 38. The size of the annular clearance $C_{3a}$ between the poppet valve 38 and the poppet sleeve 76 is preferably chosen so that it is small enough to restrict communication of relatively cold actuating fluid from the upper annular peripheral groove 144 of the poppet valve 38 to the upper poppet valve cavity 138 and lower armature cavity 89 during engine startup. Thus, the movable armature 42 and poppet valve 38 are free to operate without cold and viscous actuating fluid being present in the clearances $C_1,C_2$ The effective flow restriction provided by the clearance $C_{3a}$ (e.g., cross-sectional area and axial length) is also preferably chosen so that it is large enough to communicate relatively hot actuating fluid between the upper annular peripheral groove 144 and the upper poppet valve cavity 138 and lower armature cavity 89 during normal engine operation. This allows the movable armature 42 and poppet valve 38 to operate with a selected amount of damping imparted by the displacement or squishing of relatively hot actuating fluid from the clearances $C_1$ and $C_2$ The size of the annular clearance $C_{3a}$ should also be selected in conjunction with the selection of size for the clearance $C_2$ between the armature 42 and the poppet adapter 70. Such damping helps to minimize the tendency of the poppet valve 38 to rebound off either one of its seats 146,149 after making initial contact.

The communicating, collecting and draining means 56, in the form of collection grooves 60 and passages 58, helps minimize any pumping effect that the movable armature 42 would normally impart on the actuating fluid contained in the upper armature cavity 57. The communicating, collecting and draining means 56 and the drain passages 98 of the armature spacer 64 permit damping fluid that has been communicated to the upper and lower armature cavities 57,89 to drain back to the sump 316 without hydraulically locking the position of the armature 42 and poppet valve 38. The communicating, collecting and draining means 56 and the armature spacer drain passages 98 also permit hot actuating fluid to drain from the upper and lower armature cavities 57,89 so that the actuating fluid cannot remain there, cool off, and possibly become very viscous fluid under cold engine starting conditions.

In order to help start the engine 12 under cold engine conditions, one or more electrical signals (for example, square pulses of electrical current) having a selected amplitude, pulsewidth and period may be applied to the actuator assembly 36 over a selected time span prior to cranking the engine 12. The selected amplitude, pulsewidth, period, and time span are carefully chosen so as not to overheat and damage the actuator assembly 36. The pulses of current may be supplied by either the electronic drive unit, engine battery, or a combination of the two. The periodic electrical signals may cause the spring-biased armature 42 to reciprocate and thereby expel at least a portion of the viscous damping fluid from the upper and lower armature cavities 57,89. One important effect is the reduction of fluid film strength in the cavity 57 between the armature 42 and the stator 46. Another important effect is that the actuator assembly 36 is heated up so that it can help warm up the damping fluid that is eventually communicated to it via the clearance $C_{3a}$ between the poppet valve 38 and the poppet sleeve 76. Each of these effects facilitates quicker response of the poppet valve 38 for improved fuel injection delivery capability and timing accuracy during engine startup.

This engine starting strategy may be further refined by detecting the temperature of the actuating fluid in, for example, at least one of the manifolds 334,336 and implementing this starting strategy only when the temperature falls below a selected level. Alternatively, another engine parameter which indirectly indicates the temperature of actuating fluid in the manifolds 334,336, such as engine coolant temperature, may be detected and used for determining whether or not to implement this starting strategy.

In addition to or as an alternative to the above cold engine starting strategy, such one or more electrical signals may be applied to the actuator assembly 36 over a selected time span after the engine 12 has been stopped. When the engine 12 is stopped, it no longer drives the high pressure actuating fluid pump 332. The electrical signals cause the spring-biased armature 42 to reciprocate and thereby expel at least a portion of the hot damping fluid from the upper and lower armature cavities 57,89 before the damping fluid cools off and becomes more viscous. This strategy may be further modified by detecting ambient air temperature and applying the electrical signals to the actuator assembly 36 after engine 12 is stopped but only when the ambient air temperature falls below a selected value.

Under cold engine operating conditions, an extended fuel delivery command signal or logic pulse may be required in order to effect startup of a cold engine 12. The length of time required for the fuel delivery command is a function of actuating fluid viscosity due to various pressure drops in the circuit. Without precisely knowing what the oil viscosity is, it is difficult to calculate or estimate the exact length of time required for the fuel delivery command signal under cold engine starting conditions. If the time is underestimated, insufficient fuel injection is effected. If the time is overestimated, excessive fuel injection is effected which may over fuel and damage the engine.

One solution to the above problem of improving cold engine starting capability is to provide a sensor for directly or indirectly detecting the viscosity or temperature of the actuating fluid, generating a viscosity or temperature indicative signal which is sent to the electronic control module 454, and using a pulse width multiplier strategy to compensate for variations in the detected viscosity or temperature of the actuating fluid. The electronic control module 454 is programmed so that at normal engine operating temperatures, the maximum fuel delivery command signal $S_{10}$ is limited by a selected maximum pulsewidth which is selected to improve governability of the engine 12 and/or avoid excessive engine torque. Such selected maximum pulsewidth may be insufficient to achieve cold engine starting. Therefore, the electronic control module 454 is also programmed so that only during engine startup, the selected maximum pulsewidth is multiplied and increased by a factor wherein the factor is selected as a function of the detected viscosity or temperature of the actuating fluid. Generally, the factor increases from one to a number greater than one as the detected viscosity of the actuating fluid increases or the detected temperature of the actuating fluid decreases. After the engine 12 has started and the actuating fluid reaches normal engine operating temperature or viscosity, the selected factor becomes one.

For example, the method of starting the engine 12 may comprise the steps of the electronic control module 454 applying at least one electrical fuel delivery command signal $S_{10}$ of a selected first pulsewidth to the actuator and valve assembly 28 of the unit injector 18, supplying pressurized actuating fluid to the unit injector 18 in response to the fuel delivery command signal $S_{10}$ of the first pulsewidth, hydraulically displacing the intensifier piston 88 of the unit injector 18 over a first displacement to effect a first fuel injection quantity in response to the fuel delivery command signal $S_{10}$ of the first pulsewidth, and applying at least another electrical fuel delivery command signal $S_{10}$ of a selected second pulsewidth to the unit injector 18 after the engine is started wherein the second pulsewidth is chosen to be less than the first pulsewidth. The method further includes the steps of supplying pressurized actuating fluid to the unit injector 18 in response to the another fuel delivery command signal $S_{10}$ of the second pulsewidth and hydraulically displacing the intensifier piston 88 of the unit injector 18 over a second displacement to effect a second fuel injection quantity in response to the another fuel delivery command signal $S_{10}$ of the second pulsewidth wherein the second displacement is less than the first displacement. Consequently, the second fuel injection quantity is less than the first fuel injection quantity. Alternatively, the electronic control module 454 may apply a series of electrical fuel delivery command signals $S_{10}$ during engine startup wherein the pulsewidths of the signals gradually decrease from one selected magnitude to another selected magnitude.

Another solution to the above problem is to selectively vary the pressure of the actuating fluid supplied to the unit injectors 18. The pressure is varied by the electronic control module 454 varying the actuating fluid manifold pressure command signal $S_9$ to the primary pressure regulator 368. For example, the method of starting the engine 12 may comprise the steps of the electronic control module 454 applying an electrical fuel delivery command signal $S_{10}$ to the unit injector 18, supplying actuating fluid of a selected first pressure to the unit injector 18 in response to application of the fuel delivery command signal $S_{10}$, hydraulically displacing the intensifier piston 88 of the unit injector 18 over a first displacement to effect fuel injection, and applying another electrical fuel delivery command signal $S_{10}$ to the unit injector 18 after the engine is started. The method further includes the steps of supplying actuating fluid of a selected second pressure to the unit injector 18 in response to application of the another fuel delivery command signal $S_{10}$ wherein the second pressure is chosen to be less than the first pressure, and hydraulically displacing the intensifier piston 88 of the unit injector 18 over a second displacement to effect fuel injection wherein the second displacement is less than the first displacement. Alternatively, the electronic control module 454 may vary the actuating fluid supply pressure during engine startup such that the pressure gradually decreases from one selected magnitude to another selected magnitude.

Another solution to the above problem is to not only selectively vary the pressure but also vary the pulsewidths of the fuel delivery command signals $S_{10}$. In the above examples, the magnitudes of the actuating fluid pressure and/or the fuel delivery command pulsewidths may be selected as a function of the viscosity or temperature of the actuating fluid or another parameter which indirectly indicates such viscosity or temperature.

Another solution to the above problem is to set the clearance $C_4$, between the barrel seat 219 and the second stop 196 of the intensifier piston 88, to a selected axial length which corresponds to the maximum allowable effective stroke of the intensifier piston 88 and plunger 204. For example, the clearance $C_4$ may be chosen to be about 3.5 millimeters or 0.136 inches. The unit injector 18 is thus mechanically limited to injecting a selected maximum amount of fuel under any conditions, including cold engine operation or startup. During cold engine operation, the electronic control module 454 delivers a fuel delivery command signal $S_{10}$ having a relatively long time duration or pulsewidth without regard to actual oil viscosity but which is sufficient to effect the maximum displacement of the intensifier piston 88. The magnitude of the clearance $C_4$ is chosen so that sufficient fuel is injected for ensuring adequate starting and acceleration of the engine 12 but not more than would cause overfueling damage to the engine 12 and/or drivetrain. The magnitude of the clearance $C_4$ is also chosen so that it is smaller than the corresponding clearance between the free end of the plunger 204 and the stop member 232. Thus, if the fuel supplying means 22 runs out of fuel during engine operation, the intensifier piston 88 contacts its seat 219 first and thereby prevents the plunger 204 from striking the stop member 232 and causing possible distortion of the plunger 204 and/or the barrel 198. After engine startup is achieved, the electronic control module 454 is programmed to reduce the pulsewidth of the fuel delivery command signal $S_{10}$ to a time duration sufficient to maintain a desired engine speed.

The following is a summary of the main advantages of the HEUI fuel injection system 10 over a mechanically-actuated fuel injection system. First, the HEUI fuel injection system 10 eliminates various conventional mechanical components, such as the cam and rocker arm mechanism, used to actuate the fuel pumping plunger. Such elimination of components helps reduce cost and improve reliability and packaging of the engine 12. Due to the above advantages, the HEUI fuel injection system 10 is also attractive for retrofitting to existing conventional engines which do not yet have electronically-controlled fuel injection systems. Second, the fuel injection pressure of the HEUI fuel injection system 10 can be selected or even varied to optimal values independent of the speed of the engine 12. For example, during engine startup the magnitude of the injection pressure may be increased to a selected value in order to improve startability of the engine 12. At low engine load and low engine speed conditions, the magnitude of the injection pressure may be lowered to a selected value in order to reduce atomization of the injected fuel so that the fuel burns slower and causes quieter operation of the engine 12. At high engine load and low engine speed conditions, the magnitude of the injection pressure may be raised to a selected value in order to reduce the amount of particulates emitted by the engine 12. At partial load conditions, the magnitude of the injection pressure may be lowered to a selected value in order to reduce fuel consumption by the engine 12. In each of the above examples, the pulsewidth of the fuel delivery command signal $S_{10}$ may also be varied for optimum engine performance and/or minimal emissions. The closed-loop feedback circuit helps ensure that a desired pressure setting is achieved and maintained for as long as desired.

Other aspects, objects, and advantages of this invention can be obtained from a study of the drawings, the disclosure, and the appended claims.

We claim:

1. An actuator and valve assembly adapted for a hydraulically-actuated electronically-controlled unit injector comprising:

an electrically-energizable solenoid assembly including a movable armature;

a poppet adapter defining a bore and a drain passage, said drain passage communicating with the poppet adapter bore;

a poppet sleeve positioned in the poppet adapter bore, said poppet sleeve defining a bore, an annular seat and a laterally-extending passage communicating with the poppet sleeve bore;

a body having a bore, an actuating fluid inlet passage communicating with the body bore, and an annular valve seat defined in the body bore; and an elongated poppet valve connected to the armature and having a first end portion, an intermediate portion and a second end portion, said first end portion positioned in the poppet sleeve bore according to a predetermined diametrical clearance, said second end portion positioned in the body bore according to a predetermined diametrical clearance which is less than the other predetermined diametrical clearance, said intermediate portion defining an upper seat, said second end portion defining a lower seat, said poppet valve being movable between first, second and third positions, said poppet valve lower seat being seated against the body annular valve seat to block fluid communication with the actuating fluid inlet passage and said poppet valve upper seat being unseated from the poppet sleeve annular seat to open fluid communication with the poppet adapter drain passage when the poppet valve is at its first position, said poppet valve lower seat being unseated from the body annular valve seat to open fluid communication with the actuating fluid inlet passage and said poppet valve upper seat being unseated from the poppet sleeve annular seat to open fluid communication with the poppet adapter drain passage when the poppet valve is at its second position, said poppet valve lower seat being unseated from the body annular valve seat to open fluid communication with the actuating fluid inlet passage and said poppet valve upper seat being seated against the poppet sleeve annular seat to block fluid communication with the poppet adapter drain passage when the poppet valve is at its third position; and means for biasing the poppet valve towards its first position, said armature moving the poppet valve towards its third position when the solenoid assembly is electrically energized.

2. The actuator and valve assembly of claim 1 wherein the shape of the upper seat of the poppet valve is semi-spherical.

3. The actuator and valve assembly of claim 1 wherein the shape of the lower seat of the poppet valve is frusto-conical.

4. An actuator and valve assembly adapted for a hydraulically-actuated electronically-controlled injector comprising:

an electrically-energizable actuator including a movable member;

a poppet adapter defining a bore and a drain passage, said drain passage communicating with the poppet adapter bore;

a poppet member positioned in the poppet adapter bore, said poppet member defining a bore, a seat and a passage communicating with the poppet member bore;

a body having a bore, an actuating fluid inlet passage communicating with the body bore, and a valve seat defined in the body bore; and a poppet valve connected to the movable member and having a first end portion, an intermediate portion and a second end portion, said first end portion positioned in the poppet member bore according to a predetermined diametrical clearance, said second end portion positioned in the body bore according to another predetermined diametrical clearance, said intermediate portion defining an upper seat, said second end portion defining a lower seat, said poppet valve being movable between first, second and third positions, said poppet valve lower seat being seated against the body valve seat to block fluid communication with the actuating fluid inlet passage and said poppet valve upper seat being unseated from the poppet member seat to open fluid communication with the poppet adapter drain passage when the poppet valve is at its first position, said poppet valve lower seat being unseated from the body valve seat to open fluid communication with the actuating fluid inlet passage and said poppet valve upper seat being unseated from the poppet member seat to open fluid communication with the poppet adapter drain passage when the poppet valve is at its second position, said poppet valve lower seat being unseated from the body valve seat to open fluid communication with the actuating fluid inlet passage and said poppet valve upper seat being seated against the poppet member seat to block fluid communication with the poppet adapter drain passage when the poppet valve is at its third position; and means for biasing the poppet valve towards its first position, said movable member moving the poppet valve towards its third position when the actuator is electrically energized.

5. An actuator and valve assembly adapted for a hydraulically-actuated electronically-controlled injector comprising:

an electrically-energizable actuator including a movable member;

an adapter defining an adapter bore;

a poppet member defining a poppet member bore, and a poppet member seat;

a body having a body bore and a body seat;

a poppet valve connected to the movable member, said poppet valve having a first poppet valve seat, a second poppet valve seat, a first end portion, and a second end portion, said first end portion of the poppet valve positioned in the poppet member bore according to a first selected diametrical clearance, said second end portion of the poppet valve positioned in the body bore according to a second selected diametrical clearance, said second end portion of the poppet valve positioned in the body bore according to a second selected diametrical clearance, said poppet member positioned in the adapter bore according to a third selected diametrical clearance, said poppet valve being movable along an axis between first, second and third positions, said first poppet valve seat being unseated from the poppet member seat and said second poppet valve seat being seated on the body seat when the poppet valve is at its first position, said first poppet valve seat being unseated from the poppet member seat and the second poppet valve being unseated from the body seat when the poppet valve is at its second position, said first poppet valve seat being seated on the poppet member seat and the second poppet valve seat being unseated from the body seat when the poppet valve is at its third position; and biasing means for biasing the poppet valve towards its first position, said movable member urging the poppet valve towards its third position when the actuator is electrically energized.

6. The actuator and valve assembly of claim 5 wherein said poppet member is a poppet sleeve.

7. The actuator and valve assembly of claim 5 further including a seal positioned in the third selected diametrical clearance between the adapter and the poppet member.

8. The actuator and valve assembly of claim 7 wherein said seal is an o-ring seal.

9. The actuator and valve assembly of claim 8 wherein said adapter bore defines a peripheral groove, said o-ring seal being seated in the peripheral groove.

10. The actuator and valve assembly of claim 5 further including a shim positioned axially between the adapter and the poppet member, said biasing means also biasing the poppet member and the shim against the adapter.

11. The actuator and valve assembly of claim 5 wherein said third selected diametrical clearance is greater than each of said first selected diametrical clearance and second selected diametrical clearance.

12. The actuator and valve assembly of claim 11 wherein said second selected diametrical clearance is less than said first selected diametrical clearance.

13. The actuator and valve assembly of claim 12 wherein said first selected diametrical clearance provides a slip fit between the poppet valve and the poppet member.

14. The actuator and valve assembly of claim 5 wherein the first poppet valve seat and the second poppet valve seat each have an effective area, the effective area of the first poppet valve seat being smaller than the effective area of the second poppet valve seat.

15. The actuator and valve assembly of claim 5 wherein said first poppet valve seat and second poppet valve seat each have an effective area, the effective area of the first poppet valve seat being larger than the effective area of the second poppet valve seat.

16. An actuator and valve assembly adapted for a hydraulically-actuated electronically-controlled injector comprising:

an electrically-energizable actuator including a movable member:

an electrically-energizable actuator including a movable member;

an adapter defining an adapter bore and an adapter drain passage, said adapter drain passage arranged in fluid communication with the adapter bore;

a poppet sleeve defining an adapter bore, a poppet sleeve seat, and a poppet sleeve passage arranged in fluid communication between the poppet sleeve bore and the adapter drain passage;

a body having a body bore, an actuating fluid inlet passage arranged in fluid communication with the body bore, and a body seat;

a poppet valve connected to the movable member, said poppet valve having a first poppet valve seat, a second poppet valve seat, a first end portion, and a second end portion, said first end portion of the poppet valve positioned in the poppet sleeve bore according to a first selected diametrical clearance providing a slip fit between the poppet valve and the poppet sleeve, said second end portion of the poppet valve positioned in the body bore according to a second selected diametrical clearance which is less than the first selected diametrical clearance, said poppet sleeve positioned in the adapter bore according to a third selected diametrical clearance which is greater than each of the first and second selected diametrical clearances, said poppet valve being movable along an axis between first, second and third positions, said first poppet valve seat being unseated from the poppet sleeve seat to open fluid communication with the adapter drain passage and said second poppet valve seat being seated on the body seat to block fluid communication with the actuating fluid inlet passage when the poppet valve is at its first position, said first poppet valve seat being unseated from the poppet sleeve seat to open fluid communication with the adapter drain passage and the second poppet valve seat being unseated from the body seat to open fluid communication with the actuating fluid inlet passage when the poppet valve is at its second position, said first poppet valve seat being seated on the poppet sleeve seat to block fluid communication with the adapter drain passage and the second poppet valve seat being unseated from the body seat to open fluid communication with the actuating fluid inlet passage when the poppet valve is at its third position; and biasing means for biasing the poppet valve towards its first position, said movable member urging the poppet valve towards its third position when the actuator is electrically energized.

* * * * *

UNITED STATES PATENT AND TRADEMARK OFFICE
CERTIFICATE OF CORRECTION

PATENT NO. : 5,271,371

DATED : December 21, 1993

INVENTOR(S) : EDWARD G. MEINTS ET AL.

It is certified that error appears in the above-identified patent and that said Letters Patent is hereby corrected as shown below:

Claim 5, column 29, lines 56-59, the phrase "said second end portion of the poppet valve positioned in the body bore according to a second selected diametrical clearance" has been repeated. Please delete the second occurrence.

Claim 5, column 29, line 68, after the word "valve" insert --seat--.

Claim 16, column 30, lines 51-54, the phrase "an electrically-energizable actuator including a movable member;" has been repeated. Please delete the second occurrence.

Claim 16, column 30, line 58, delete "an adapter" and insert --a poppet sleeve --.

Signed and Sealed this

Twenty-seventh Day of December, 1994

Attest:

BRUCE LEHMAN

Attesting Officer

Commissioner of Patents and Trademarks